US008342414B2

(12) United States Patent　　(10) Patent No.: US 8,342,414 B2
Chapman　　(45) Date of Patent: Jan. 1, 2013

(54) MULTIFACE DOCUMENT

(76) Inventor: Bryan P. Chapman, Alderley (AU)

( * ) Notice: Subject to any disclaimer, the term of this patent is extended or adjusted under 35 U.S.C. 154(b) by 0 days.

(21) Appl. No.: 13/098,321

(22) Filed: Apr. 29, 2011

(65) Prior Publication Data

US 2011/0266350 A1　　Nov. 3, 2011

Related U.S. Application Data

(60) Provisional application No. 61/329,985, filed on Apr. 30, 2010.

(51) Int. Cl.
*G06K 19/02*　　(2006.01)
(52) U.S. Cl. .................................... 235/488; 235/487
(58) Field of Classification Search .............. 235/488, 235/487, 492, 454, 462.01
See application file for complete search history.

(56) References Cited

U.S. PATENT DOCUMENTS

| | | | | |
|---|---|---|---|---|
| 4,928,996 | A * | 5/1990 | Oshikoshi et al. | 283/109 |
| 6,135,503 | A * | 10/2000 | Lob et al. | 283/63.1 |
| 6,698,797 | B2 * | 3/2004 | Lackey et al. | 283/63.1 |
| 7,370,807 | B2 * | 5/2008 | Buursma et al. | 235/492 |
| 7,762,590 | B2 * | 7/2010 | Staub et al. | 283/72 |
| 7,832,771 | B2 * | 11/2010 | Hoeppner et al. | 283/70 |
| 7,967,341 | B2 * | 6/2011 | Hahn et al. | 283/107 |

* cited by examiner

*Primary Examiner* — Daniel St. Cyr
(74) *Attorney, Agent, or Firm* — Marvin H. Kleinberg; Marshall A. Lerner; Kleinberg & Lerner, LLP

(57) ABSTRACT

A multisided card having at least two obverse faces and two reverse faces that are adjacent one another, can be used to print and store relatively insecure information of the obverse faces and to have more sensitive information stored and printed on the adjacent reverse faces. To protect privacy, a caricature or cartoon of an individual can be placed on an obverse face, which image cannot be read by facial recognition techniques but could be recognized by human observers. Many of the features of the card can be utilized in a virtual card that exists in machine memory or cyberspace. A virtual purse or wallet can be created in which to store such virtual cards.

17 Claims, 26 Drawing Sheets

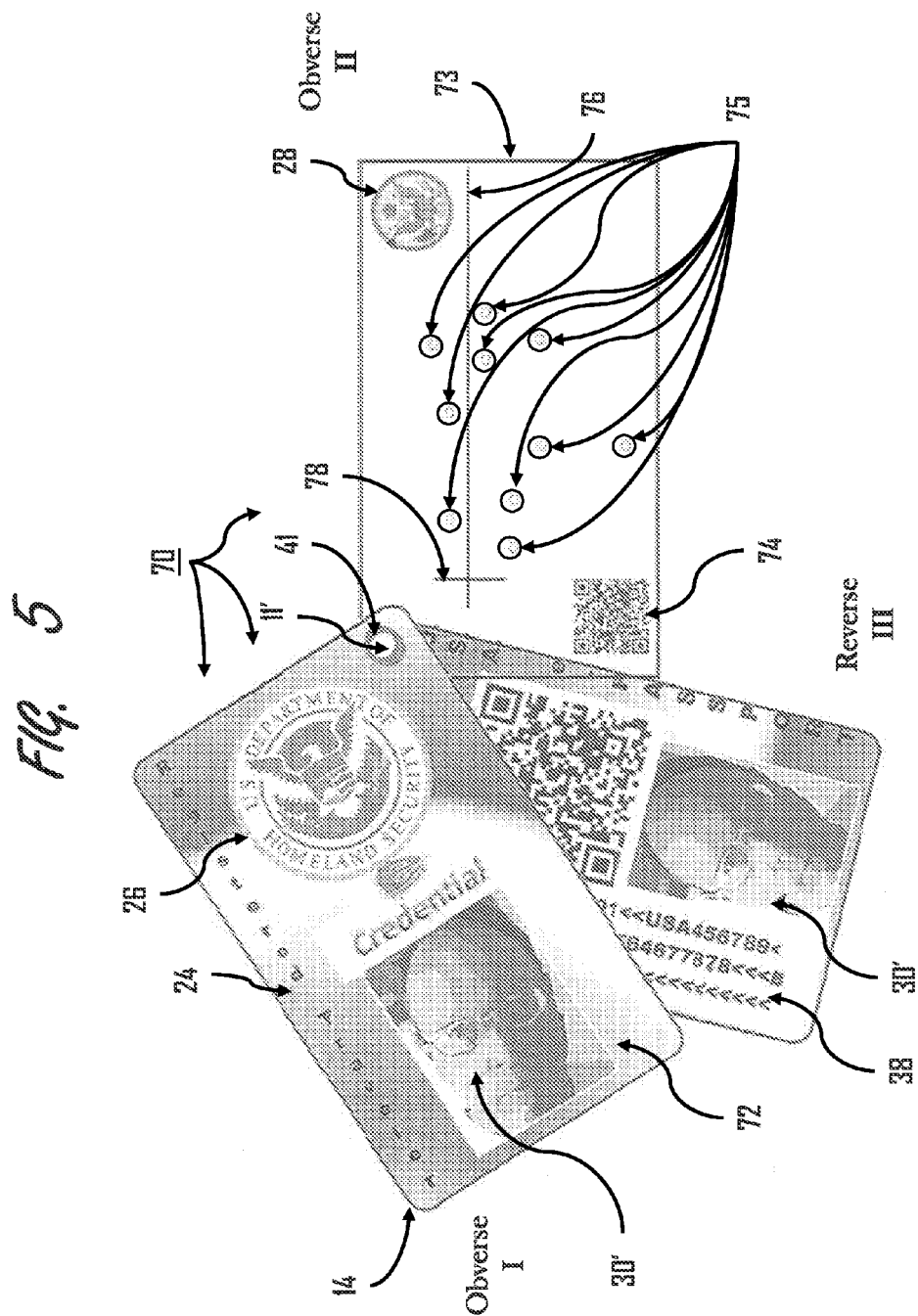

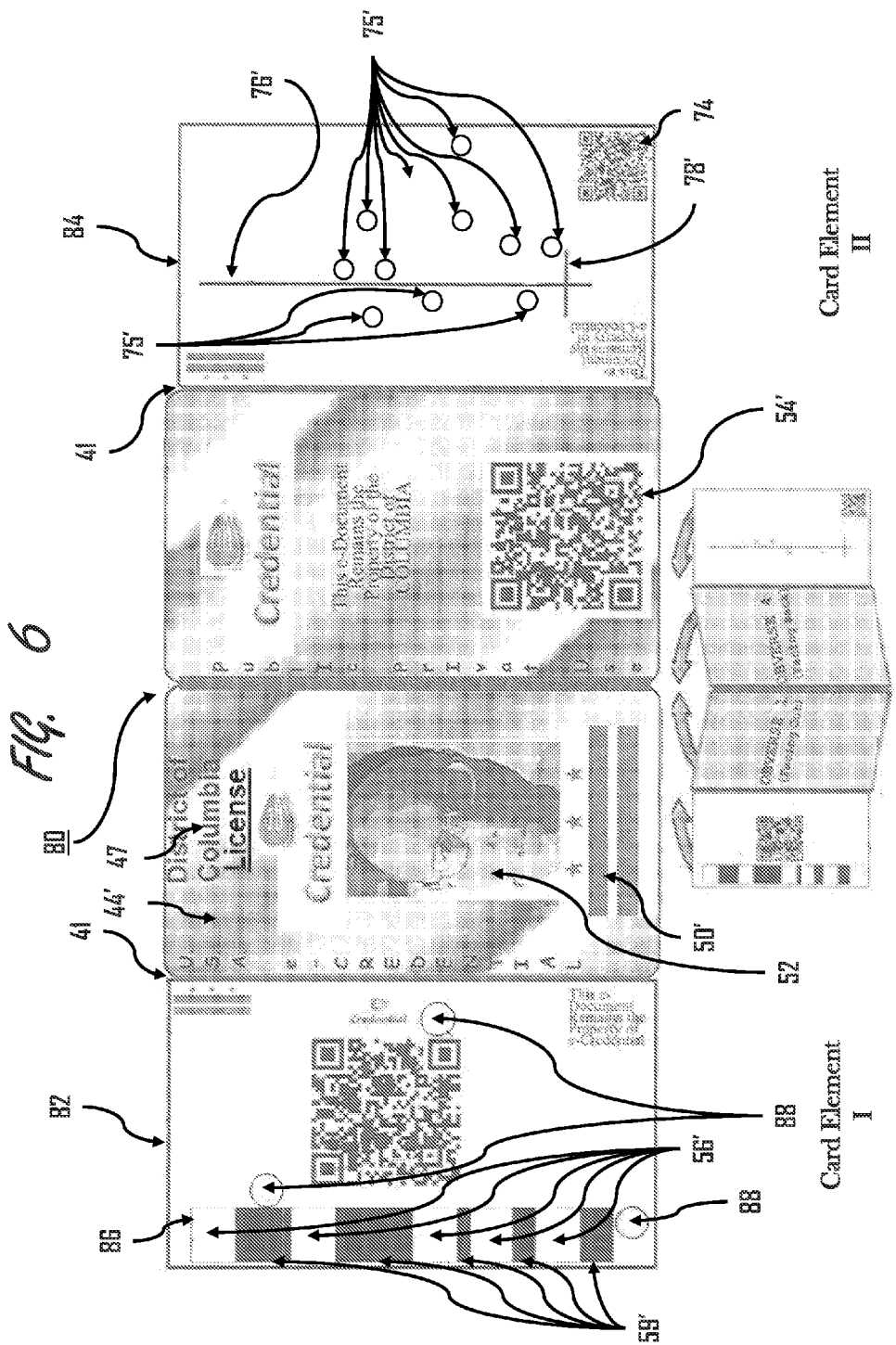

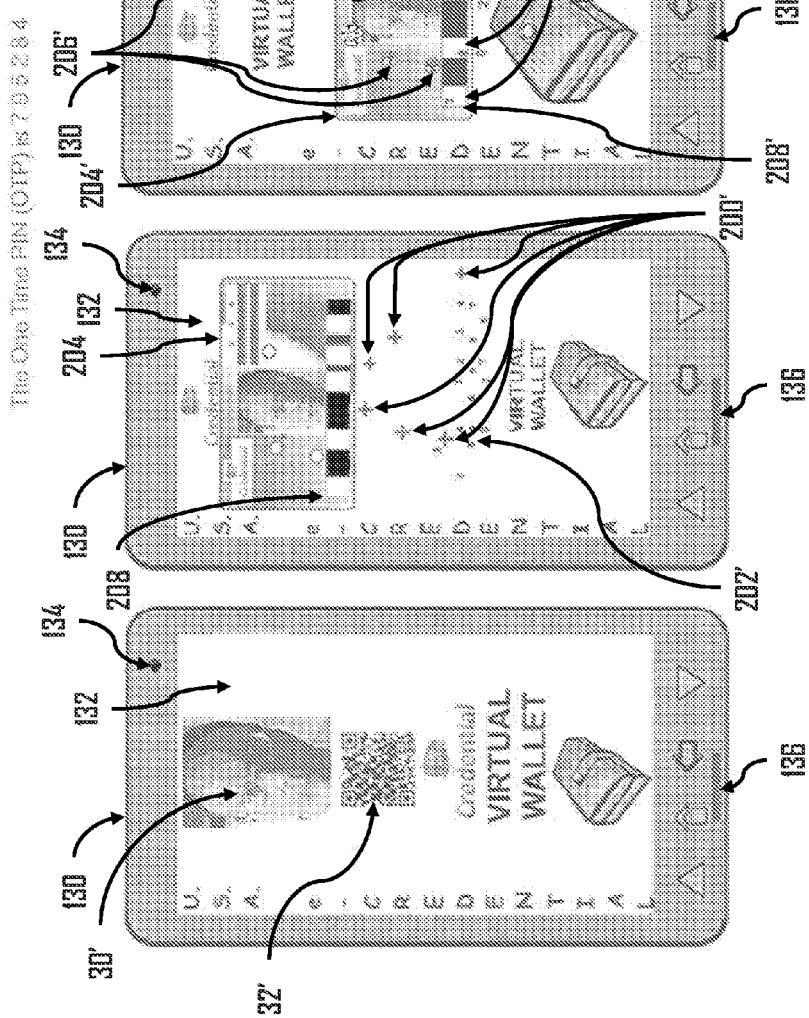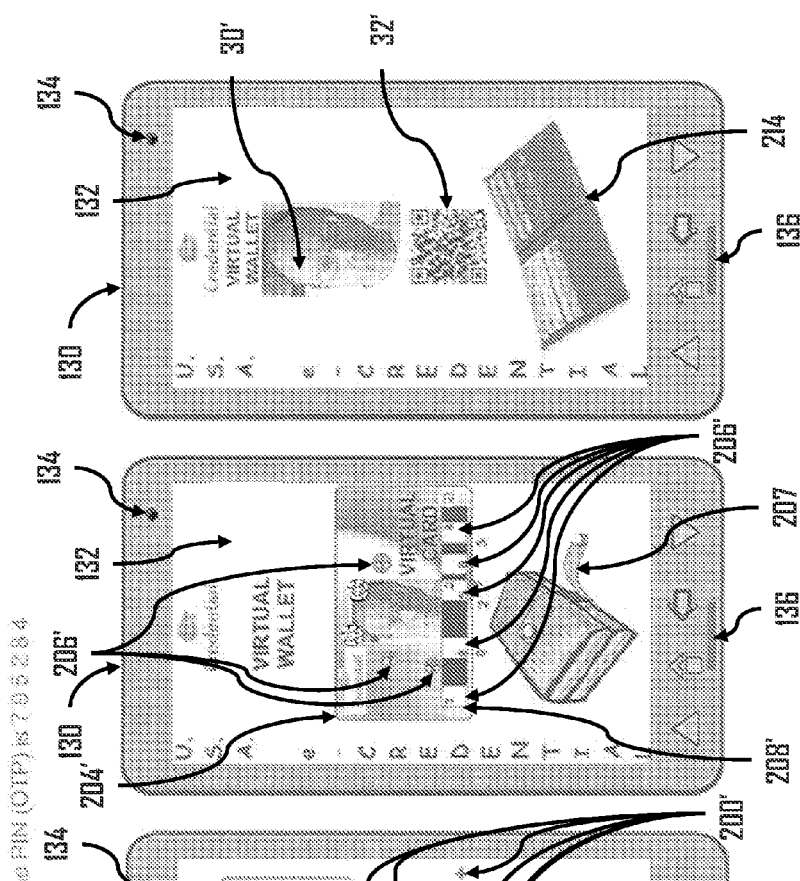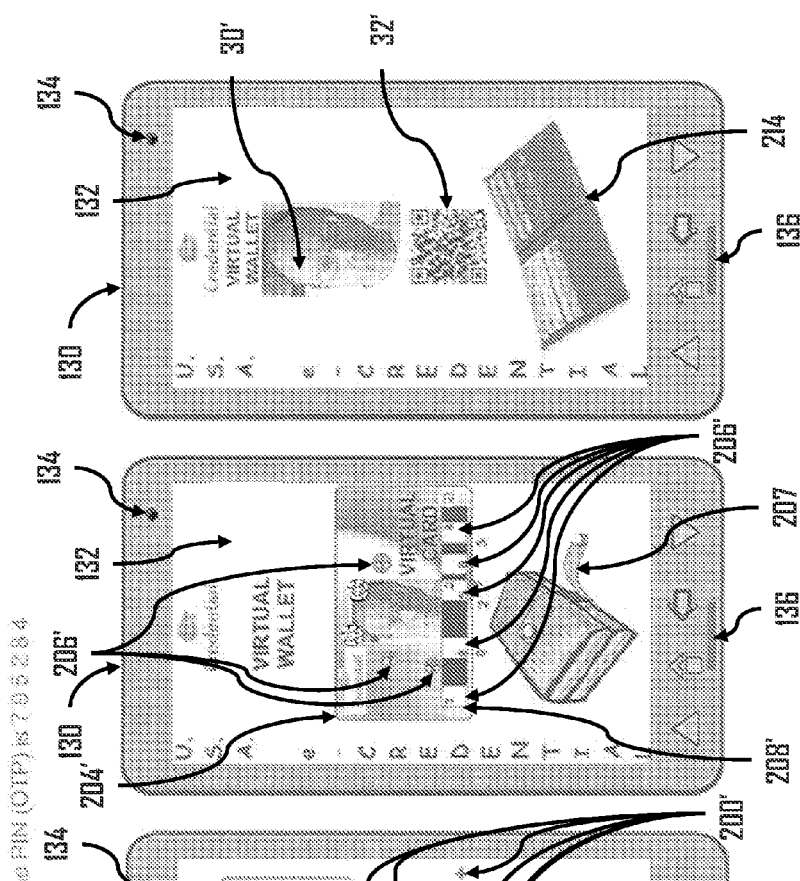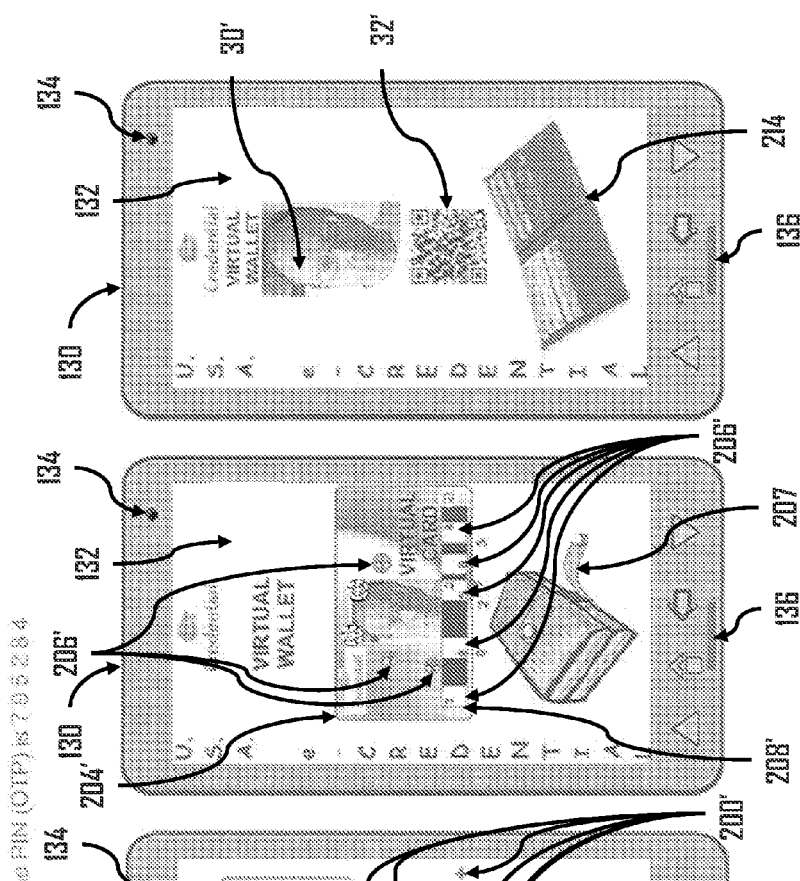

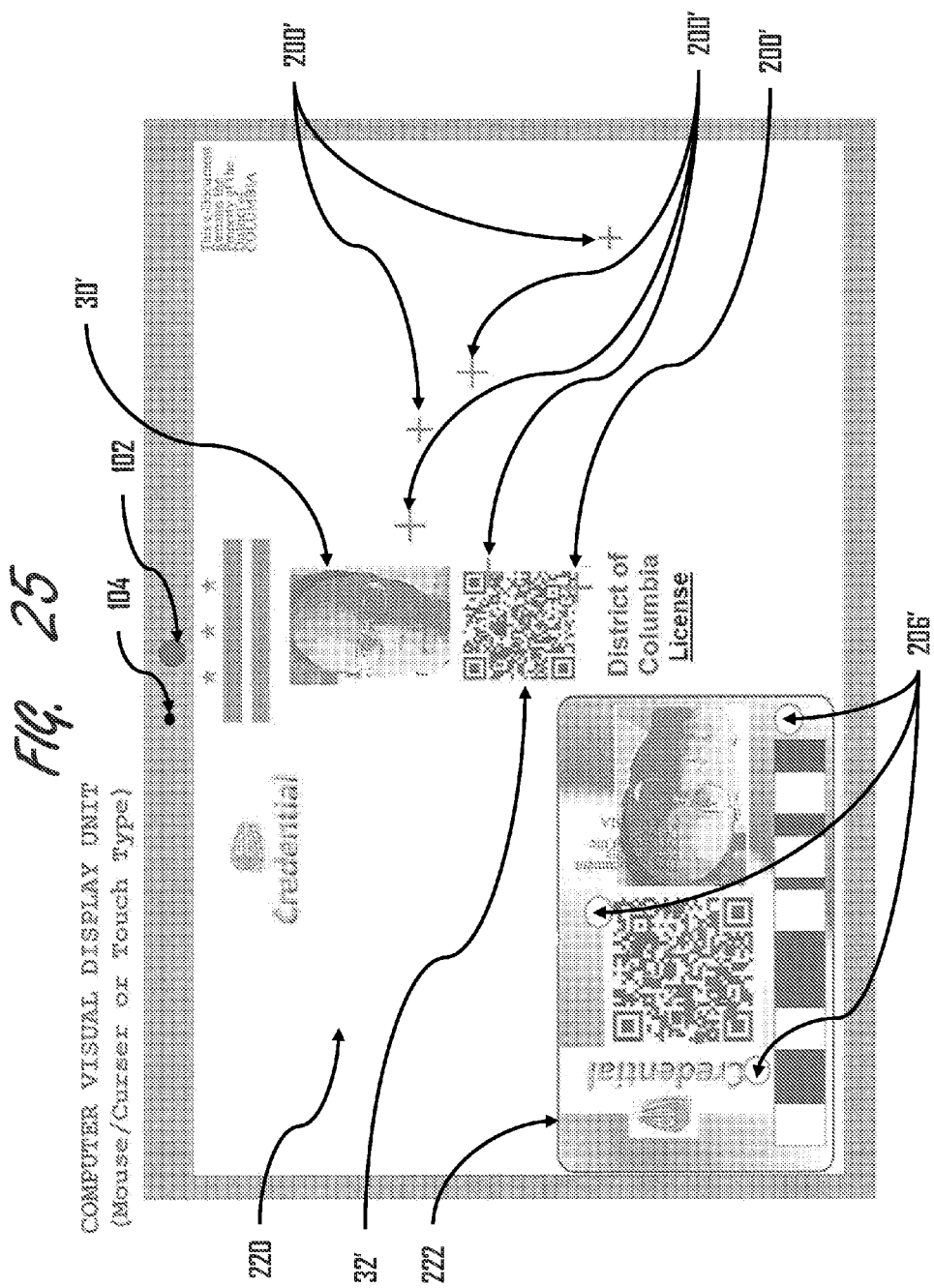

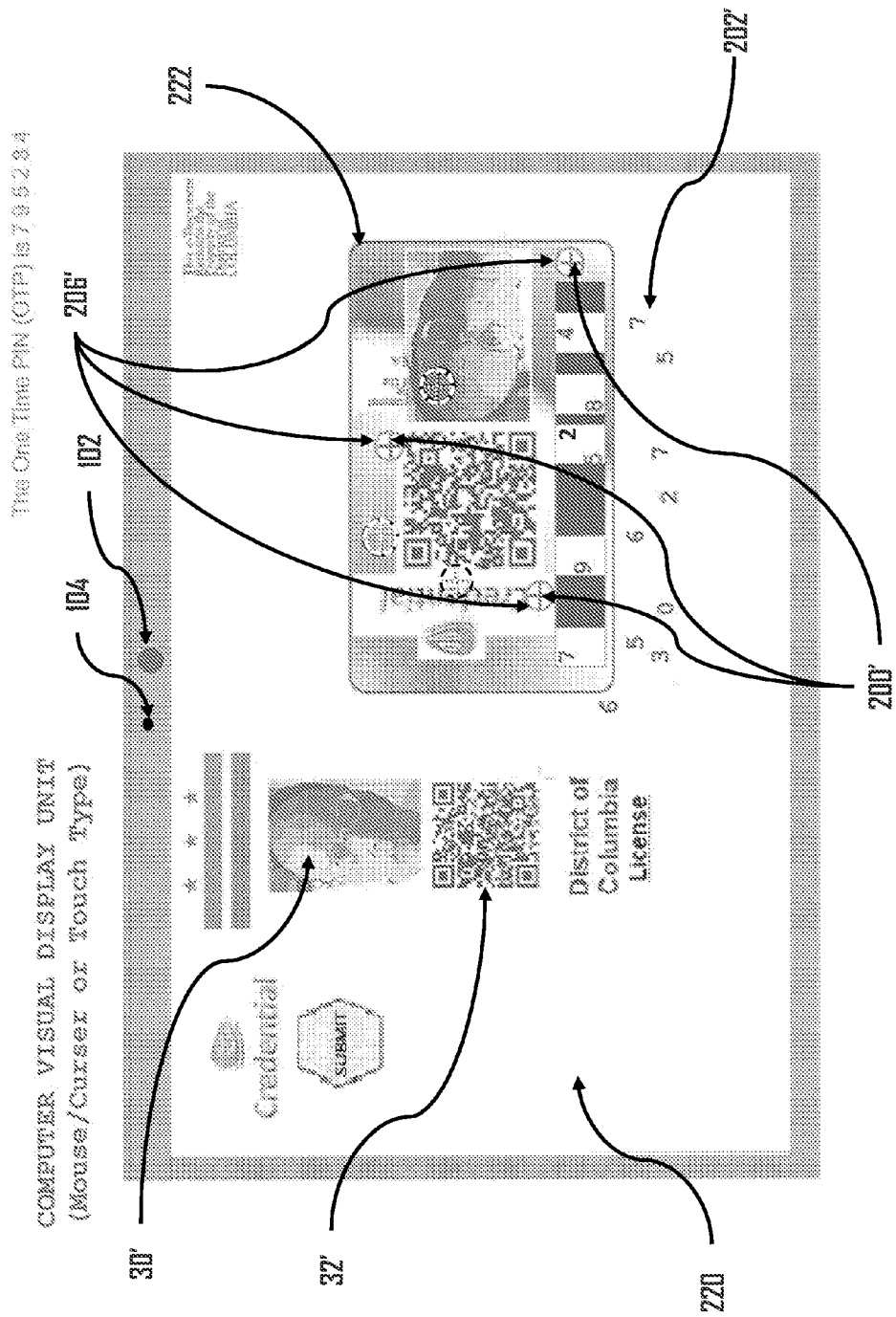

MULTIFACE DOCUMENT

BACKGROUND OF THE INVENTION

1. Field of the Invention

The present invention relates to documents for identification and, more particularly, documents or cards that can be used in secure transactions or for travel.

2. Description of the Related Art

For many years, identification cards have been provided which have, on an obverse face, pictures, information about the bearer and, on a reverse face, a magnetic strip containing much of the same information. Such cards have been used a driver's licenses, credit or debit cards, and, in recent years as an integral part of a passport document.

Variations of such a card might include embedded codes, matrix codes or optically read information strips. Still other variations might include radio frequency identification circuits ("RFID") which can be embedded in the card body and can be remotely accessed for the information contained therein or have an embedded contact or radio frequency so called Smart Chip.

SUMMARY OF THE INVENTION

A problem with current cards or documents in which the card is an integral portion, is the inherent insecurity in a card or document that is open to public gaze and scrutiny both visually and electronically in several formats. Information on the card can be perceived by any observer and surreptitious copies may be made of the information that is visible on a card face. For example, a photograph may be taken of a card and used to duplicate the card as a counterfeit.

Documents with embedded RFID devices are intended to be remotely read by authorized agencies, yet anyone with an appropriate RFID interrogating device can gain access to the information, as well. Similarly, matrix codes, names, addresses, dates of birth, or other optically read information can be copied for nefarious purposes. Such a document or card is therefore, inherently insecure.

Virtually all documents and cards which serve either a governmental function or a commercial purpose contain limited amounts of information. Moreover, if a picture of the holder is included, it is possible that use of the card or document might be subjected to picture recognition software and the data available can be retrieved and stored in a database linked to the picture and the individual which, in all cases, may not be a desired result. The questions of privacy and secure data, especially for financial transactions should always be a source of concern for the holder/user of the document.

BRIEF DESCRIPTION OF INVENTION

According to the present invention, a document or card is further subdivided into segments so that there are at least four faces capable of carrying information. There are two obverse or outer faces and two reverse or inner faces. The two segments may be joined by an integral hinge, either at the vertical side or joining the bottom of one segment with the top of the other or with a grommet that permits the segments to rotate relative to .each other so that the normally concealed reverse faces can be displayed.

Each document or card is preferably constructed of fluid resistant flexible material and or a laminate of materials that, if bent or semi-deformed, will return substantially if not completely to its original finished shape or contour. A laminated document or card in a preferred form would consist of two or more variable thickness rigid and/or flexible laminates. In a preferred embodiment, the card or document would be made up of several layers with a first layer of clear, wear resistant material. A second layer could also be clear, having its reverse side security printed in a manner that would be tamper evident. A third layer can be colored to complement the security printed second layer and, preferably, is constructed to act as a faraday cage. Such a cage can be printed with a metallic ink. A fourth layer can carry or contain a passive transponder or a plurality of transponders which can act as a user controlled radio frequency database which can store biometric identification for the lawful holder or user of the document. A fifth layer of clear material preferably includes, on its reverse side, a security print that is tamper evident, A final or sixth layer should also be of a clear, wear resistant material.

Among the several features of the present invention is the provision of a caricature on a outer or public surface of the document or card of the bearer. This graphic image, which cannot be used in a facial recognition program, to a human observer, can be used to recognize the bearer as the person authorized to have the document.

An additional feature of the present invention can be the provision of a matrix code which can be recognized by a scanner, PC, Laptop, Netbook PDA or cell phone camera as an address or URL which can bring up a web page with information. In the case of a document connected with a commercial operation such as a merchant, the web page can provide an encoded personal identification number which can only be seen when appropriately masked by a specially configured portion of the document. The mask can be normally concealed when the reverse sides are adjacent and only the obverse sides are visible.

If desired, another matrix code can, when scanned, generate biometric information about the bearer which can then be independently verified by appropriate biometric sensors operated to check the identity of the card bearer.

In an embodiment which includes the embedding of an RFID chip also known as a radio frequency smart chip, an identification database in the document or card (as is currently required under U.S. government policy for passports), a faraday cage screen can be embedded or imprinted on or in the document using a metallic ink on an intermediate layer on both parts of the document or card or so that when the reverse sides are adjacent, the RFID chip is completely shielded, protecting against unauthorized access. Alternatively, the RF antenna circuit can be interrupted and only connected with a pressure connection or a sliding switch.

It is also possible to imprint with metal ink on an interior surface or a laminate of the card's materials, the optically readable information normally included within a passport. When the interior surfaces are displayed, the information can be read, but when the interior surfaces are concealed, the information is no longer accessible.

In a first embodiment of the invention, the document comprises two cards each preferably a laminate of materials each preferably constructed of fluid resistant flexible material that, if bent or semi-deformed, will return substantially, if not completely, to its original finished shape or contour, joined at one corner by a grommet which allows the cards to be rotated, relative to each other, revealing the interior or reverse surfaces and the information contained thereon. In alternative embodiments, the two cards are joined by an integral hinge either at the side or at the top and bottom so that they can be folded together to conceal the reverse faces with only the exterior, obverse faces being visible.

In alternative embodiments, additional cards each preferably a laminate of materials and each preferably constructed of fluid resistant flexible material that, if bent or semi-deformed, will return substantially if not completely to its original finished shape or contour. By adding such cards, there can be provided yet additional features, including the feature of a mask which can interact with a PC Screen that is touch sensitive or mouse driven or a "smart phone" or other PDA device with an interactive display and internet access. There can then be displayed on the screen patterns which can be recognized as an internet URL, or a onetime personal identification number, or a validation or confirmation code for use in such matters as card transactions without the need for the physical card. Receipts or other documents can be created, on the display which are recognizable by ATM machines. Also, such virtual documents could serve as a travel document, such as a boarding pass, that preferably provides that a biometric binding between the system administrator/operator and the end user be established in order that a biometric confirmation can be established.

In yet other embodiments, the document may be a "virtual card" which exists only in cyberspace but can be employed in conjunction with displayed information to effectuate a secure transaction. The concept could extend to a "virtual wallet" which could contain several "virtual cards", each associated with a different application or business transaction. Each card could represent an account with a merchant or a bank and would include a code that would start a contact with the merchant or bank. Yet other functions can be envisioned for the "virtual card" such as health treatment cards, insurance cards, driver's licenses among others.

In all instances however, it is preferred that a biometric binding of the system administrator/operator and the end user be established in order that a biometric relationship can be established for most if not all transactions. This can be facilitated by a user dragging his caricature or picture and dropping it over a one time transaction high density code which is activated by that action. Simultaneously, an integrated camera or other biometric data gathering device collects the biometrics of the user at that time and, preferably, both verifies and authenticates the user's identity so that the transaction can proceed.

Each transaction may at any stage create a high density code that may be retained in a PC, laptop, netbook, smart phone or any other device with a memory, a display and an internet connection, for subsequent use after validation and authentication, if necessary, by contemporaneously collected biometrics of the individual seeking entry at a gate, effecting a transaction at an ATM, entering or remaining in a secure area, or for medical purposes including record transfers of any type and medical treatment authorizations or-other useful purpose.

The novel features which are characteristic of the invention, both as to structure and method of operation thereof, together with further objects and advantages thereof, will be understood from the following description, considered in connection with the accompanying drawings, in which the preferred embodiment of the invention is illustrated by way of example. It is to be expressly understood, however, that the drawings are for the purpose of illustration and description only, and they are not intended as a definition of the limits of the invention.

BRIEF DESCRIPTION OF THE DRAWINGS

FIG. 4, including

FIG. 5; shows the document of FIG. 1 connected using a grommet with an added document element;

FIG. 6 is an alternative embodiment of the invention with four documents elements joined by integral hinges;

FIGS. 17A, 17B, and 17C, is a representation of a camera and optional Face, Palm, fingerprint, iris, retina or voice recognition equipped telephone being used with a virtual card in a secure transaction;

FIGS. 18A and 18B is a view of a document or card that within its laminates is an interrupted RFID two part circuit which is completed with either a pressure domed switch or a sliding switch;

FIG. 23, including

FIG. 24, including FIGS. 24A, 24B, 24C and 24D, shows the use of a "smart" cellular phone to invoke a transaction using a owner controlled and operated virtual wallet (FIG. 24D) or purse (FIG. 24A 24B & 24C) to both secure virtual cards as well as facilitate their use by the owner with multiple entities;

FIG. 25 is a view of a display showing a "virtual" card at the beginning of a secure transaction; and FIG. 26 is a view of the display of FIG. 25 at a later stage of a secure transaction.

DESCRIPTION OF THE PREFERRED EMBODIMENTS

Figure 1:
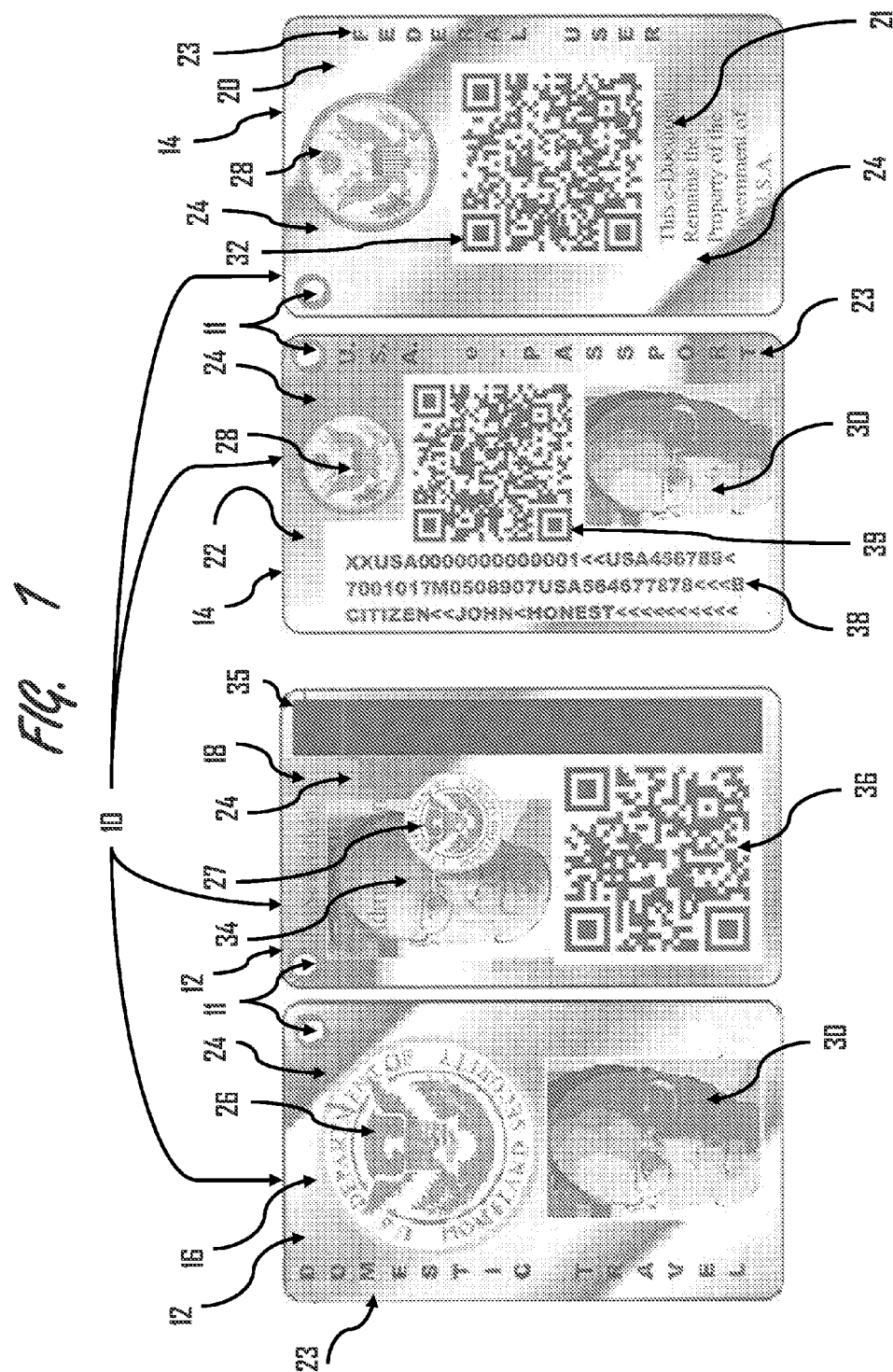
FIG. 1 is a representation of a document according to a first embodiment of the present invention.

In the embodiment shown in FIG. 1, a document 10 is provided with four (4) faces. In this embodiment, the document 10 includes two separate cards, card I 12, and card II 14. Each card 12, and 14 has an obverse face and a reverse face. As seen, card I 12 has an obverse face 16 and a reverse face 18. Similarly, card II 14 has an obverse face 20 and a reverse face 22.

As shown, the obverse faces 16, 20 include a distinctive colored pattern 24 to discourage counterfeiting and a document ownership statement 21. This pattern may further include security metallic ink and may be unique to each document's visible surface, including properties in the thermal infrared range. The obverse faces 16, 20, can also include an official user purpose or application generated with security ink, preferably a metallic ink 23 governmental seal, for example, a departmental seal 26 on obverse face 16 and a governmental seal 28 on obverse face 20.

A degraded image 30 of the bearer on obverse face 16 is sufficiently representative to enable a human observer to recognize the image 30 as that of the bearer. Such a degraded image 30 might be considered a "caricature" or "cartoon" and is intended to be unusable for facial recognition equipment. Accordingly, a surreptitious scan of the image would not allow any information obtained from obverse surfaces to be included in or associated with a database record that is otherwise associated with the bearer.

On the obverse face 20 of card II 14, an encoded matrix image 32 is imprinted, preferably with metal ink. This matrix image 32 can, in conjunction with a scanner, camera equipped PC, laptop, netbook, or tablet device, or any digital camera in a cell phone or other PDA device, be decoded to represent the address of a web site which, when invoked, can provide information about the document 10 and how it can be employed as, for example, as a travel document or a passport or other secure type application document.

The reverse faces 18, 22 are not normally visible but must be manipulated by the bearer or a person with the authority to view those faces. As shown, one of the reverse faces 18 includes a photographic image 34 of the bearer but partly overlaid with a departmental seal 27 to thwart facial recognition scans but still capable of human interpretation as being a photograph of the holder.

A magnetic strip 35 is included for the storage of magnetically coded information that can be read by a magnetic scanner. A digital matrix 36, when decoded, presents biometric data, preferably in an encrypted form, of the bearer which can be used to verify independently scanned biometric data at an inspection station.

The comparison of the stored biometric data with the independently obtained biometric data is used to confirm the identity of both the respective card and the bearer of the document 10. In accordance with the teachings of the present inventor, the biometric data of the document 10 and the currently presented biometric data can be compared with the bearer's biometric data that is stored in a remote data base and or the secure portable database contained in the matrix and card surface readable data to confirm that the bearer is the person that he purports to be.

In this example, the other reverse face 22 carries information usually found on a passport, including the governmental seal 28, an optically readable information strip 38 and a digital matrix 39. The caricature 30 is also included which sufficiently resembles the bearer so that a human operator can, in all probability, recognize the bearer as the person so caricatured to enable the visual matching of the two component parts 14 & 16 during assembly or should they become separated, deliberately or inadvertently.

In the example, card I and II are perforated at 11 in such a manner as to not interfere with the functionality of either card but to enable their conjoining with preferably an identifiable security grommet that allows their rotation by the holder's deliberate action to expose their obverse and reverse surfaces 12 and 14.

Figure 2:
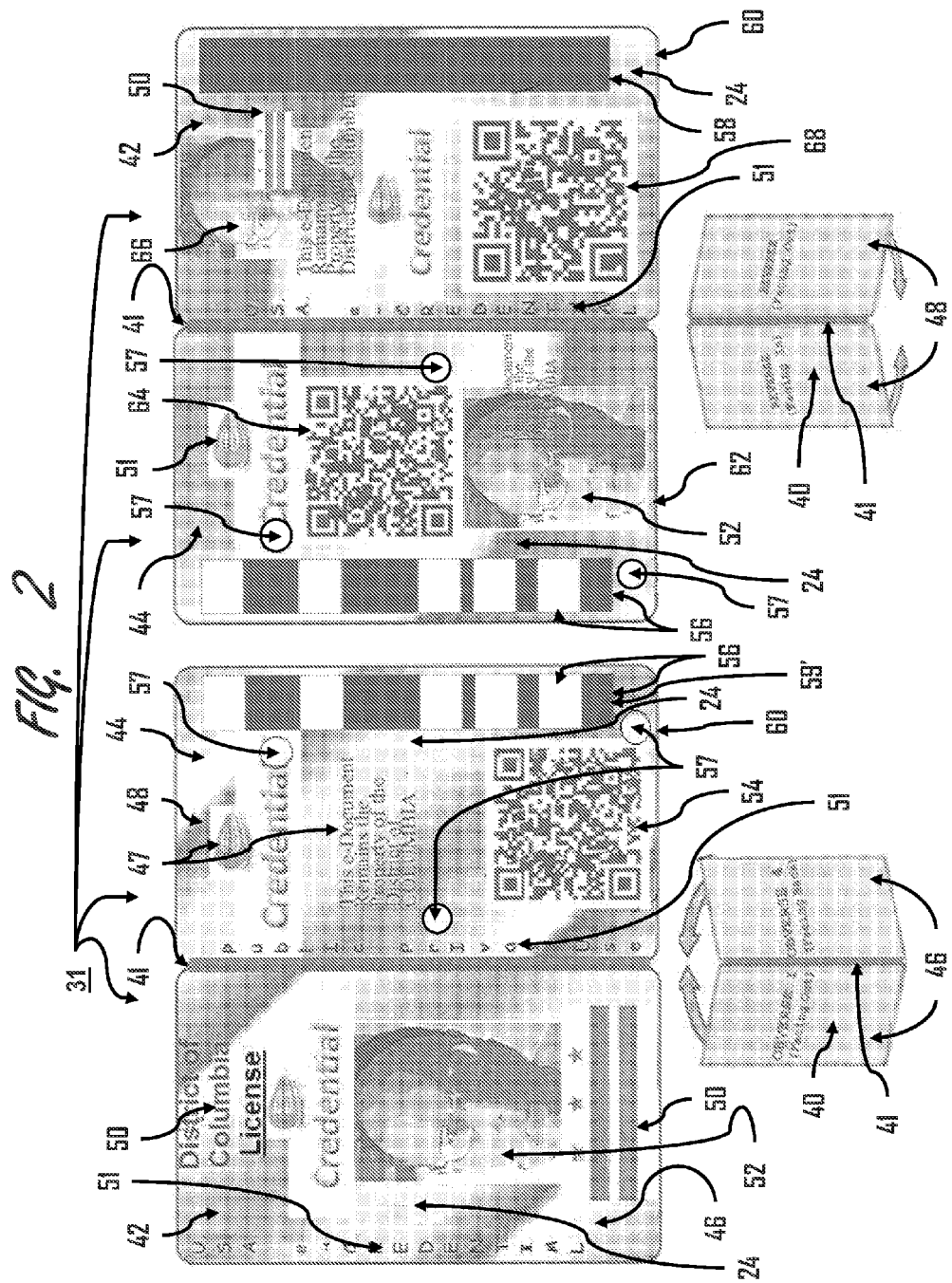
FIG. 2 is a representation of a document according to a second embodiment of the invention in which the parts are joined by an integral hinge.

Turning next to FIG. 2, there is shown an alternative embodiment of the document of the present invention. The alternative document 31, as in the embodiment of FIG. 1, includes two cards joined by an integral hinge 41, card I 42 and card II 44. For the present example, the document 31 could be a District of Columbia Driver's, or any other type of License.

Accordingly, the obverse faces 46, 48 include a governmental seal 50, a caricature of the bearer 52 and a coded matrix pattern 54, which, when scanned by an appropriate device, resolves into a web address where additional information can be found, preferably specific to the user. As in FIG. 1, a color pattern 24, unique to each document surface, can help prevent counterfeiting.

An additional feature of this embodiment is a transparent and obstructed mask strip 56 of the same color as the dark magnetic strip 58. As an example here the strip is divided into five holder specific zones which may be used in conjunction with an encoded display (better seen in FIG. 16 and 22) that can reveal a selected alpha numeric code combination which, when entered, validates a transaction or verifies an inspection of use specifically in card "not present" (virtual card) transactions. To preserve the integrity of the mask 56, a dark magnetic strip 58 is located on the reverse face of the opposing card 42 so that when the document 40 is folded, the masking elements of the strip 56 will be obscured and not discoverable while the document or card is securely closed.

The interior reverse faces, reverse face of card I 60 and reverse face of card II 62, contain information normally hidden from public scrutiny and which is exposed only when the bearer wishes to expose it. Which information is on which face is a matter of choice and the faces could be considered interchangeable. In the present embodiment, the reverse face of card II 62 contains the caricature 52 together with an encoded matrix 64 which, when decoded, can provide secure personal and biometric information unique to the bearer, preferably in an encrypted form.

The reverse face of card I has a photograph 66 of the bearer, partially obscured by the seal 50 to defeat facial recognition software. An additional code matrix 68 can include other secure personal information including image and other biometric data as well as other data such as date of birth and place of residence. Much of the same biographic and or encryption key and or checksum-data information can also be encoded and stored on the magnetic strip 58, an important function of which is to obscure the mask pattern of the transparent, segmented mask 56. To facilitate the use of the mask 56, indexing or positioning points 57, here shown as clear spaces on both the obverse and reverse faces 48, 62 are provided. The card surface 44' is placed uppermost against the display screen of a computer, netbook, cell phone or other device which has an integral display screen, wherein the indexing apertures 57 can be positioned against single use indexing marks in order that the transparent apertures can be utilized.

Figure 3:
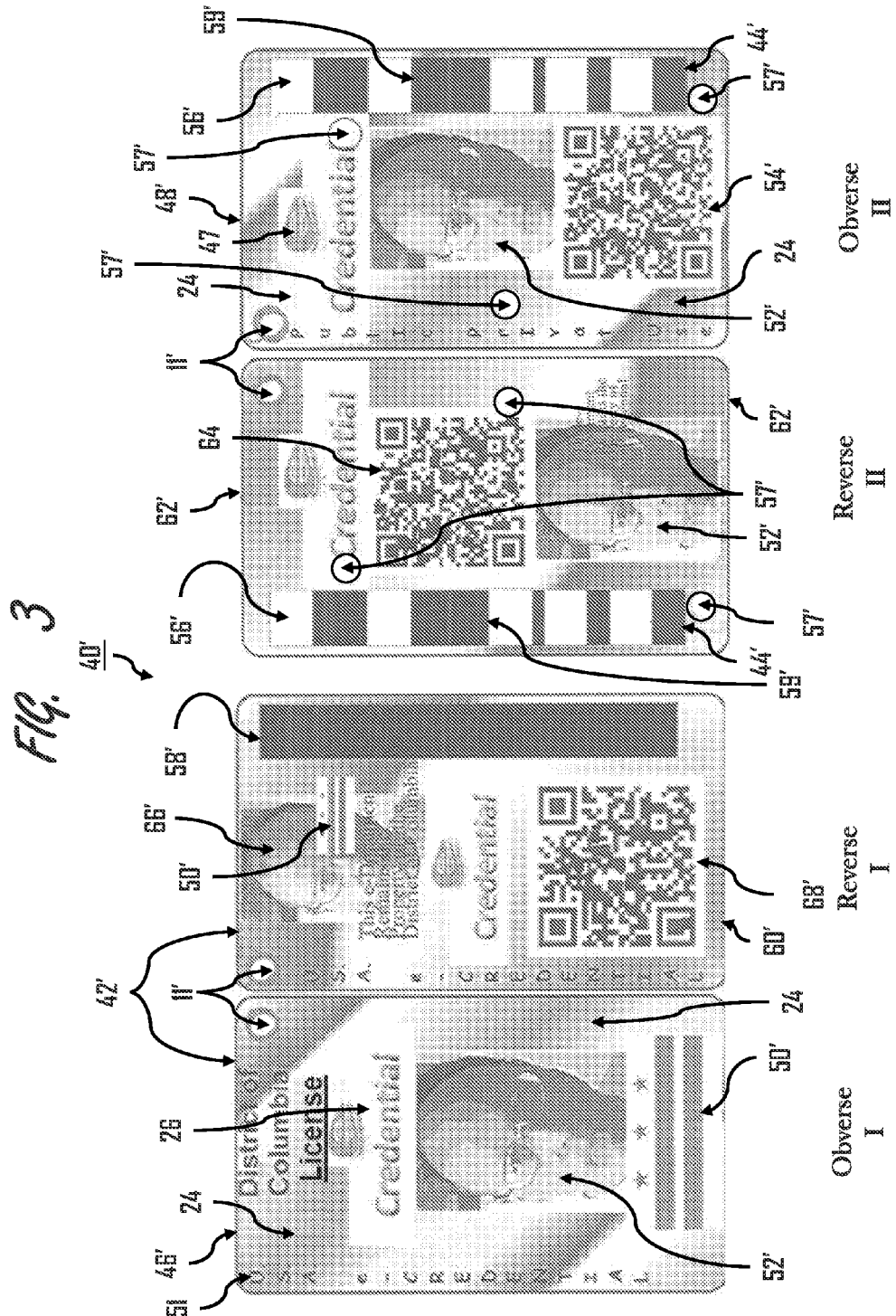
FIG. 3 illustrate an alternative embodiment of the document of FIG. 1 but with different surface and construction features.
Figures 4A, 4B:
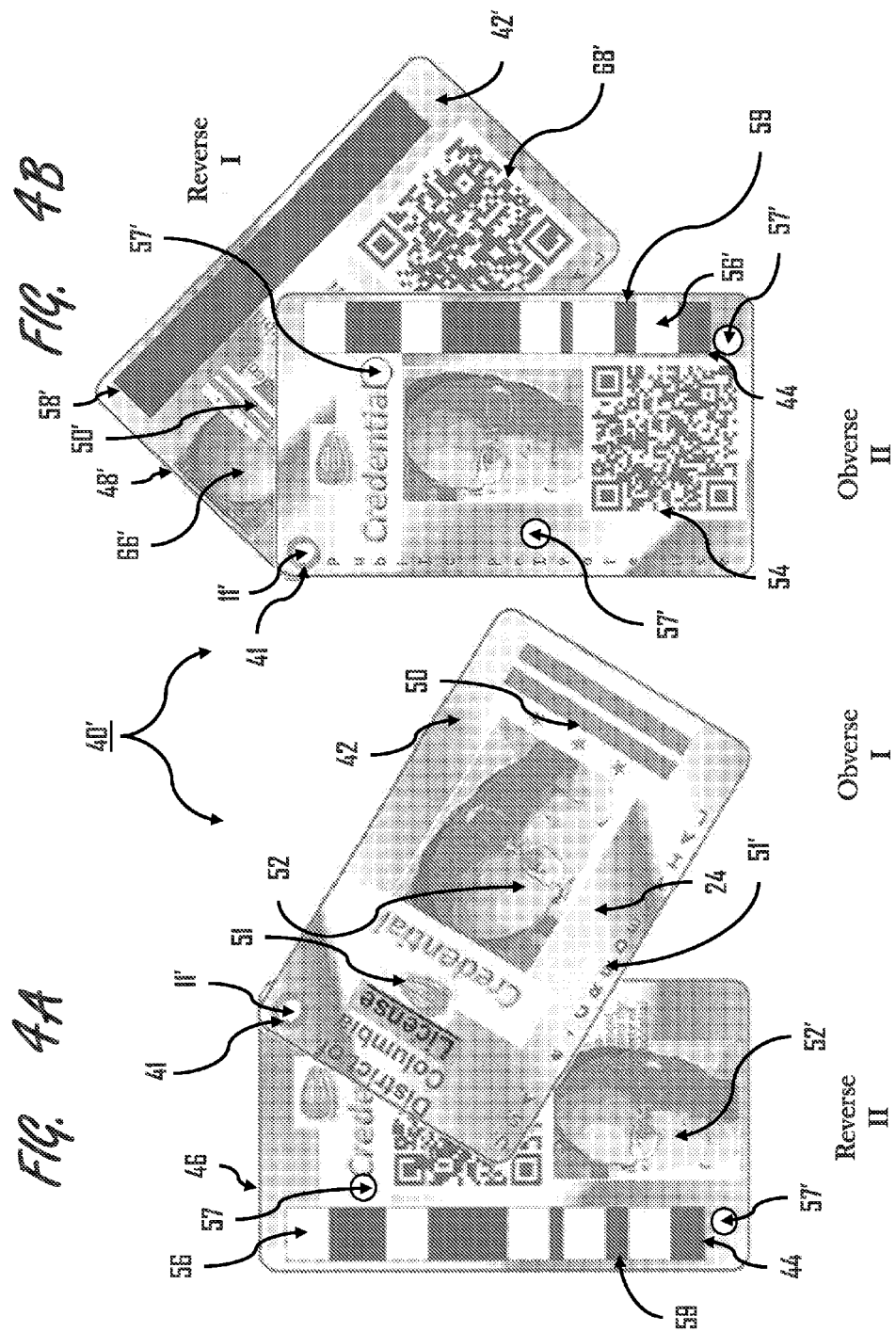
FIGS. 4a and 4b shows the assembled document of FIG. 3 and by example FIG. 1 with the component parts being joined with a grommet.

Turning now to FIGS. 3 and 4, an alternative document 40', substantially identical to document 40 is shown with grommet holes 11' in lieu of the integral hinge 41, permitting the cards to be joined with, preferably, a security identifiable grommet (shown in FIG. 4). Similar features will be given similar reference numbers with an added prime.

As in FIG. 2, the document 40' could be a District of Columbia Driver's License. Accordingly, the obverse faces 46', 48' include a governmental seal 50'and 47, logo type text specific to the documents functionality 51, a caricature of the bearer 52' and a coded matrix pattern 54', which, when scanned by an appropriate device, resolves into a web address where additional preferably individual user specific information can be found. As in FIG. 1, a color pattern 24, unique to each document, can help prevent counterfeiting.

An additional feature of this embodiment is a transparent mask strip 44, 56, 59' which may be used in conjunction with an encoded display (better seen in FIG. 16 and 22) that can reveal a selected alpha numeric code combination which, when entered, can validate a transaction or verify an inspection. To preserve the integrity of the mask 56', a dark magnetic strip 58' is located on the reverse face of the opposing card 42' so that when the document 40' is joined closed as per hinge 41 as depicted, the masking elements of the strip 44 and 56' will be, as the user determines, either obscured or exposed.

The interior reverse faces, i.e. the reverse face of card I 60' and the reverse face of card II' 62', contain information normally hidden from public scrutiny and which is exposed only when the bearer wishes to expose it. Which information is on which face is a matter of choice and the faces could be considered interchangeable. In the present embodiment, the reverse face of card II' 62' contains the caricature 52' together with an encoded matrix 64' which, when, decoded, can provide personal and biometric information unique to the bearer and can act as a secure portable database.

The reverse face 60' of card I' has a photograph 66' of the bearer, partially obscured by the seal 50' to defeat facial recognition software. An additional code matrix 68' can include other personal information such as date of birth and place of residence and can act as a secure portable database. Much of the same biographic information can also be encoded and stored on the magnetic strip 58' including encryption/decryption key and checksum data, which obscures the mask pattern or zones of the transparent portions of mask 56'. To facilitate the use of the mask 56, indexing points 57', shown as clear spaces on both the obverse and reverse faces 48', 62' are provided.

FIG. 4 shows the assembled components of FIGS. 1 and 3 being conjoined by a grommet preferably of a security and identifiable type 41. It can be seen that when the document or card is in the closed position the five clear apertures 56 within the strip 59 are not perceivable against the matching dark background of the magnetic strip 58 which is specifically size matched for this purpose.

FIG. 5 shows an embodiment similar to that of FIG. 1, but with an added document or card element 70. The obverse face of card I", 72 differs slightly from the obverse face 16 of card I 12. However, the card II 14 of FIG. 1 can be used without modification.

Added card element 73 is preferably a laminate inserted between card I" 72 and card II 14. Preferably, card element 73 is transparent with some additional features added such as the governmental seal 28 and a matrix element 74 which can perform the function of a secure encrypted portable database specific to that document or card 70 function and may include biometric data or templates of the holder. A plurality of viewing apertures 75, which may either be actual apertures in the card element or may be just printed or preferably security printed within the laminates with metallic ink circles defining the "real apertures" or otherwise. A horizontal indexing line 76 and a vertical indexing line 78 near one end of the horizontal line 76 are, preferably, again security printed within the laminates with metallic ink. The indexing lines 76 and 78 are used to align the card with an information presentation on a display screen so that elements of the presentation can be selected and can serve as a secure, one time, "card not present" (virtual card) personal identification characters, which, when entered, identify a particular user, much the same as PIN numbers.

Turning to FIG. 6, a hinged document 80 functions much in the same way as the document of FIG. 1, in which the elements are to be joined, preferably, by a security identifiable grommet. In this embodiment, reverse surfaces can be utilized in like manner to FIG. 1, however in this case they are hinged as in FIG. 2 with additional transparent card elements 82, 84. Both elements 82 and 84 are constructed, preferably, as laminates as in FIG. 5 and are respectively used to complement the reverse surfaces to provide multi functionality with one document or card.

The first card element 82 includes a mask 86, similar to transparent mask 56. Card element 82 need not be transparent but includes indexing apertures 88 so that the card element can be aligned with a display to reveal alpha numeric characters in the mask 56 clear areas.

The second card element 84 is similar to the transparent card 70 of FIG. 5 and includes the same features, such as the viewing apertures 75' and the horizontal and vertical alignment lines 76',78'.

Figure 7:
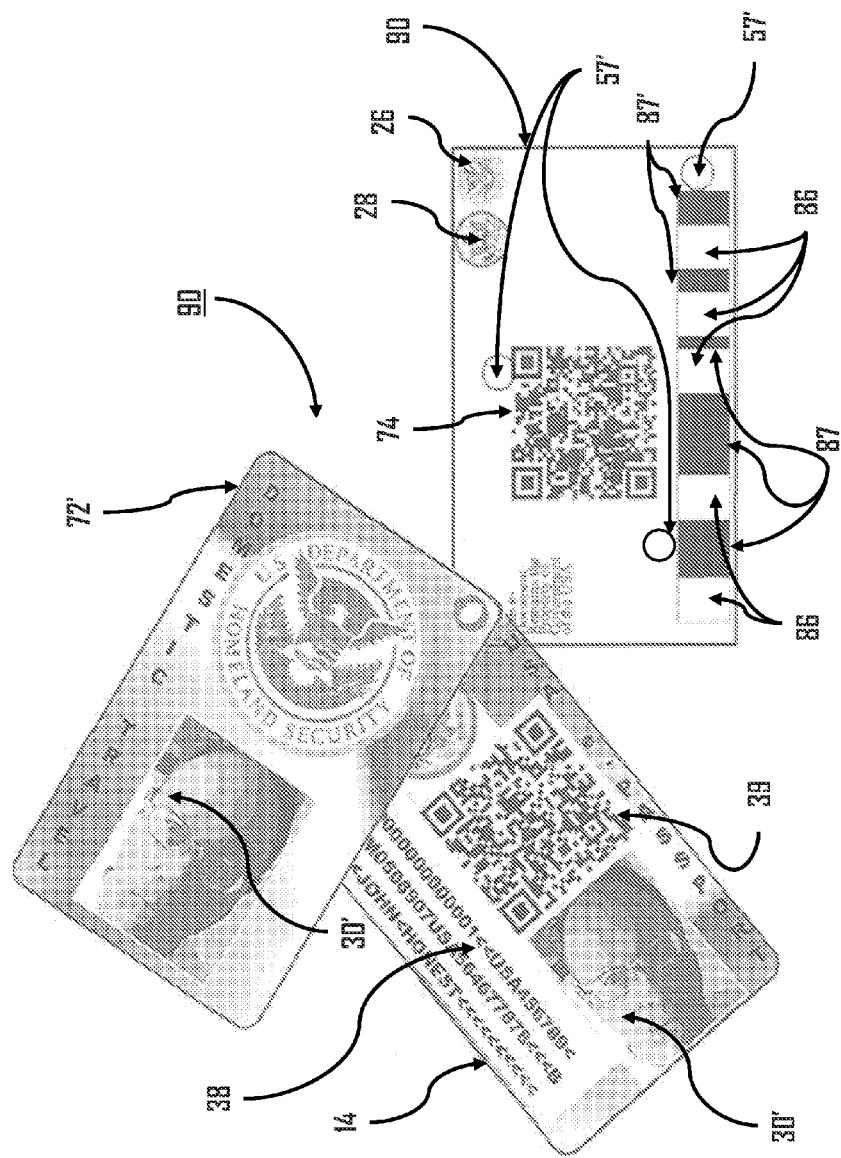
FIG. 7 is an alternative embodiment of the document of FIG. 5 with elements joined by a grommet and with an additional element having distinctive surface features.

Turning next to FIG. 7, there is shown an alternative form of the document of FIG. 5 with a different additional inserted card 90 between a first card 72' and card II 14. As shown here, card II 14 includes a caricature 30, the digital information strip 38 and the digital, preferably encrypted matrix 39, which may contain data as previously described.

The inserted card 90 can include a departmental seal 26 and a governmental seal 28. Also included are transparent alignment apertures 57, a transparent mask 86 and semi transparent or obstructed components 87. When aligned using 57 on a preferably touch sensitive display screen, it can be viewed through mask 86 to determine which alpha numeric characters on a display screen are revealed to provide a unique validation code. Preferably, element 90 is constructed to be similar to the FIG. 5 element 73

Figure 8:
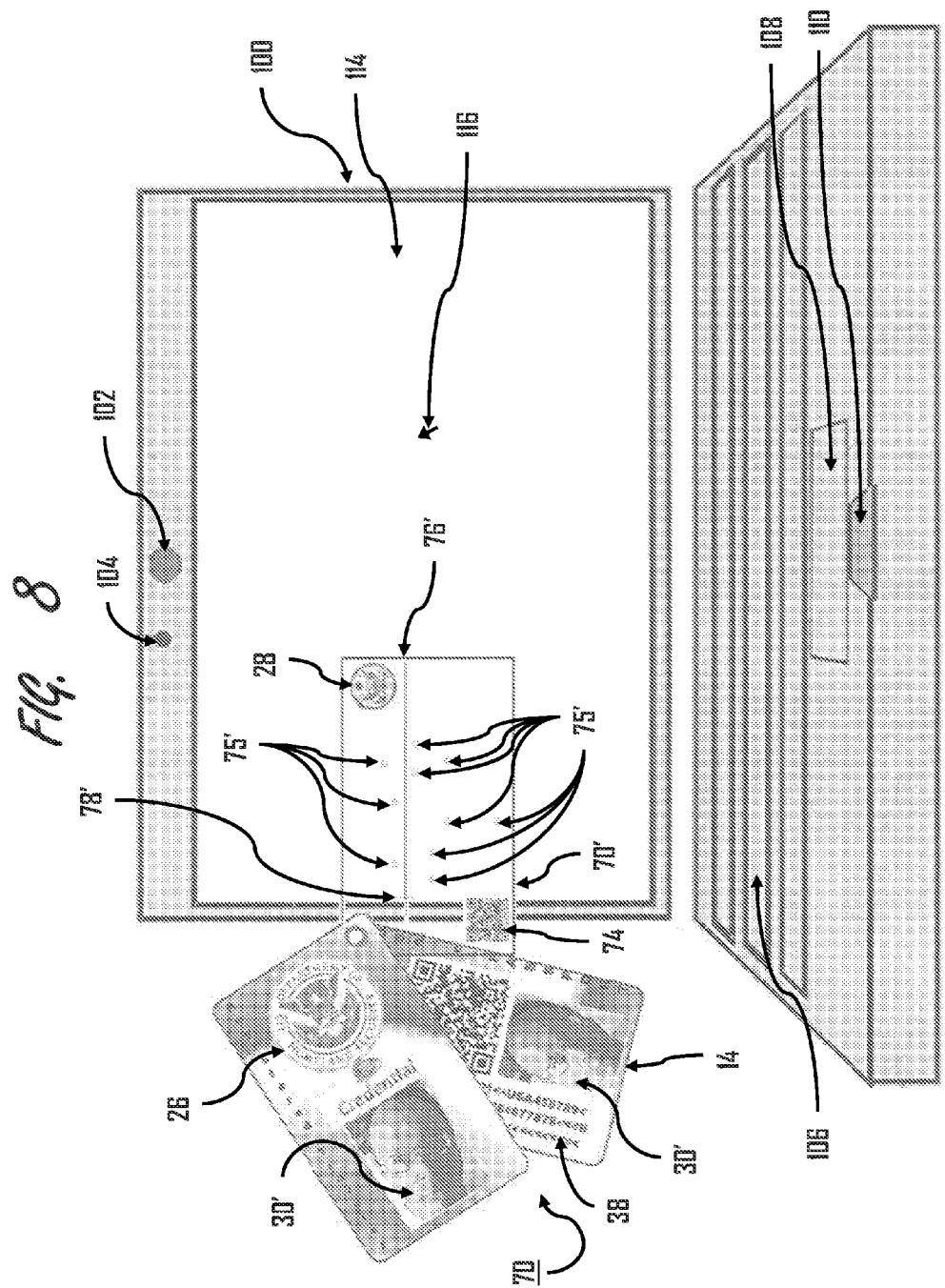
FIG. 8 shows the document of FIG. 5 in use with the display of a computer which will enable secure card not present transactions.
Figure 9:
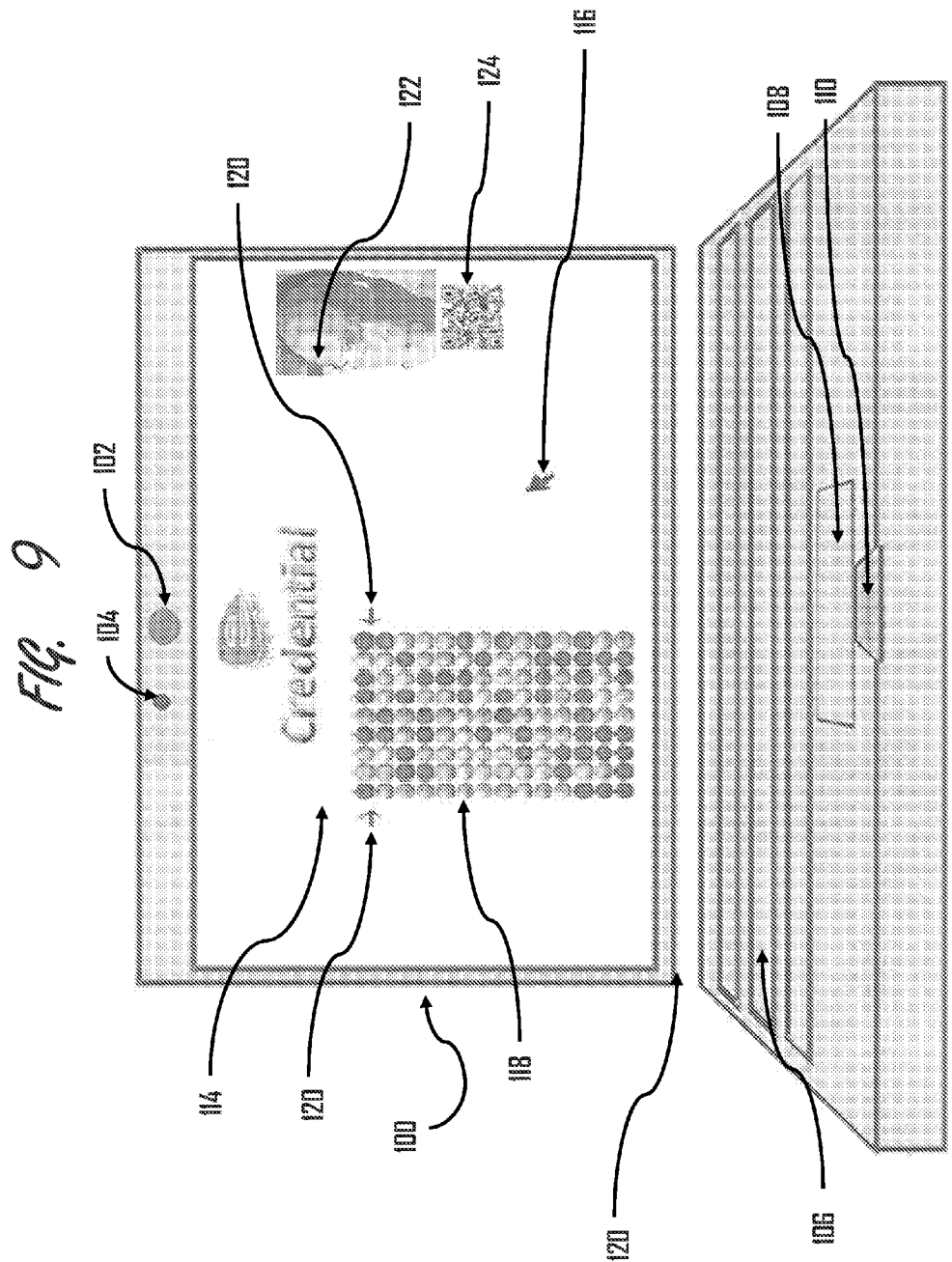
FIG. 9 is a representation of a computer screen containing information which is related to the use of a document for a secure card not present transaction.
Figure 10:
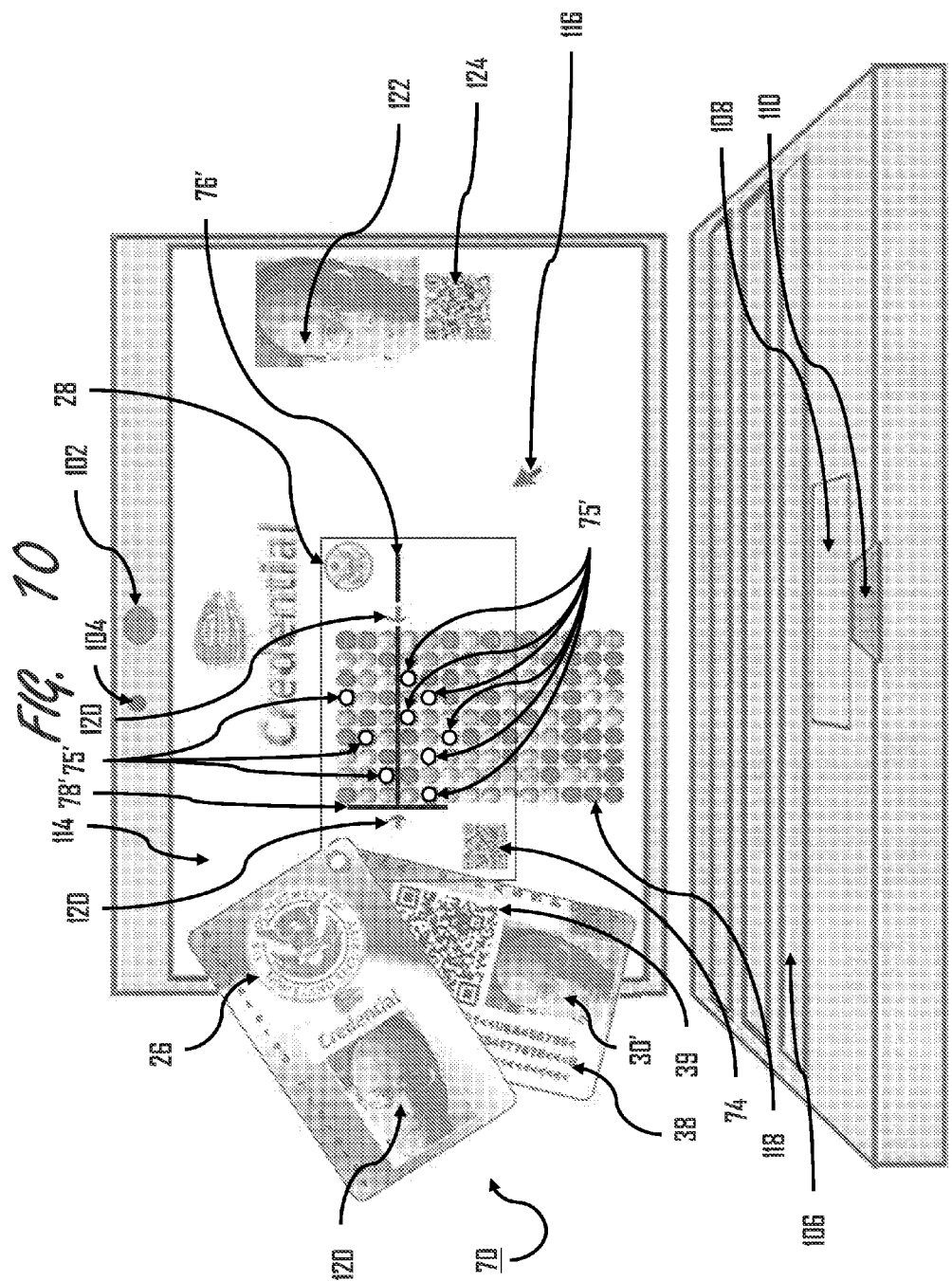
FIG. 10 shows the use of the document of FIG. 5 with the computer screen image of FIG. 9 to complete a secure card not present transaction.

FIGS. 8-10 illustrate the use of a document 70 in completing a secure transaction. In FIG. 8, the transparent card 70 is held against the screen of a display 100. Preferably, the display 100 includes an integral camera 102 and microphone 104. Also shown is a keyboard 106 that includes a touchpad 108 and a fingerprint scanner 110 in addition to the usual alpha numeric keys. The screen 114 is shown with a conventional cursor 116.

In FIG. 9, the screen 114 displays a matrix 118 made up, in this example, of various colored spheres or circles. A pair of indexing arrows 120 is shown adjacent the top of the matrix 118. During the transaction verification process, the matrix 118 can move about the screen 114 and the indexing arrows 120 can move vertically until all screen movement is paused by an appropriate key stroke or touch pad "click", at which point, the matrix 118 and indexing arrows become stationary, with the indexing arrows 120 adjacent a selected one of the rows of the matrix 118. The screen 114 also displays a caricature 122 and a digital transaction confirmation trigger matrix 124.

At the next step in the transaction, after the matrix 118 is paused, the transparent card 70 is placed over the screen 114 and the vertical line 78 is placed adjacent the edge of the matrix 118 and the horizontal line 76 is aligned with the indexing arrows 120. The apertures 75 will then be aligned with selected spheres of the matrix 118 elements, which when cursor 116 is maneuvered over them and clicked, will, on completion, activate a confirmation code combination. If the screen 114 is a touch screen, a stylus may be used to touch each of the revealed variable colored spheres to enable a system recognized code or one time pin Alternatively, the cursor 116 can be drawn under each aperture and the selected character may be clicked.

When all of the revealed code characters have been identified, in a preferred embodiment of the system, the caricature image 122 can be dragged over the digital trigger matrix image 124. The integral camera 102 can then take an image or sequence of images of the user and, with the predetermined triggering of the matrix with the caricature of the intended user, the image of the user and the confirmation code can be transmitted to an appropriate organization where the confirmation code and image can be verified. If verified, the transaction is consummated. The transaction can range from a travel authorization or a visa to a transaction with a vendor of goods or services, as well as the issuance of a high density code or a virtual card which may have a single or multiple use functionality which, when displayed at a terminal or reader of any type, can provide verification and authentication, which can permit entry, payment or other useful purpose. The dragging of a caricature image 122 over the digital trigger matrix image 124 provides the basis for consistent positioning of the user for imaging and, where appropriate, be used subsequently for prosecution of fraud, inasmuch as all transactions are biometrically bound to the user and the customer with transaction specific encryption, decryption keys.

Figure 11:
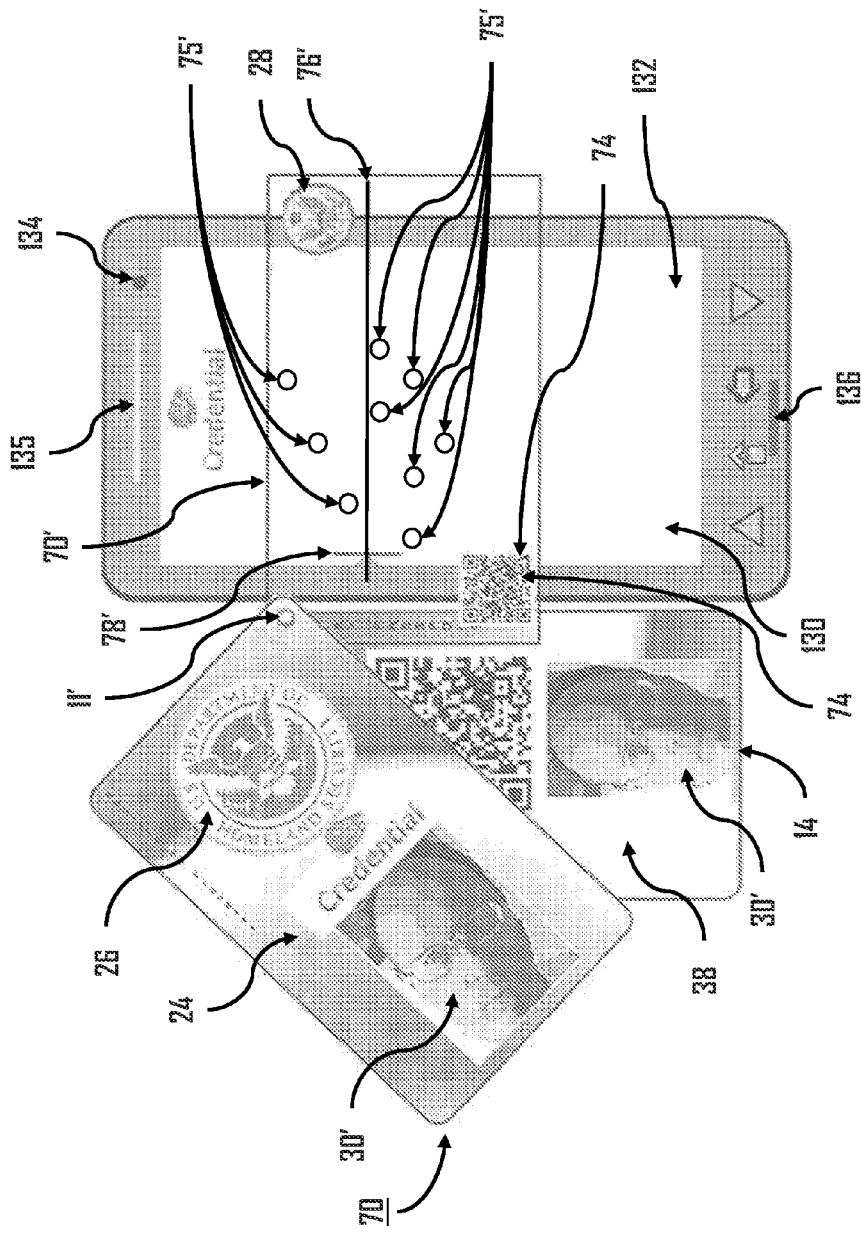
FIG. 11 shows the document of FIG. 5 in use with cellular telephone computer which will enable secure card not present transactions.
Figure 12:
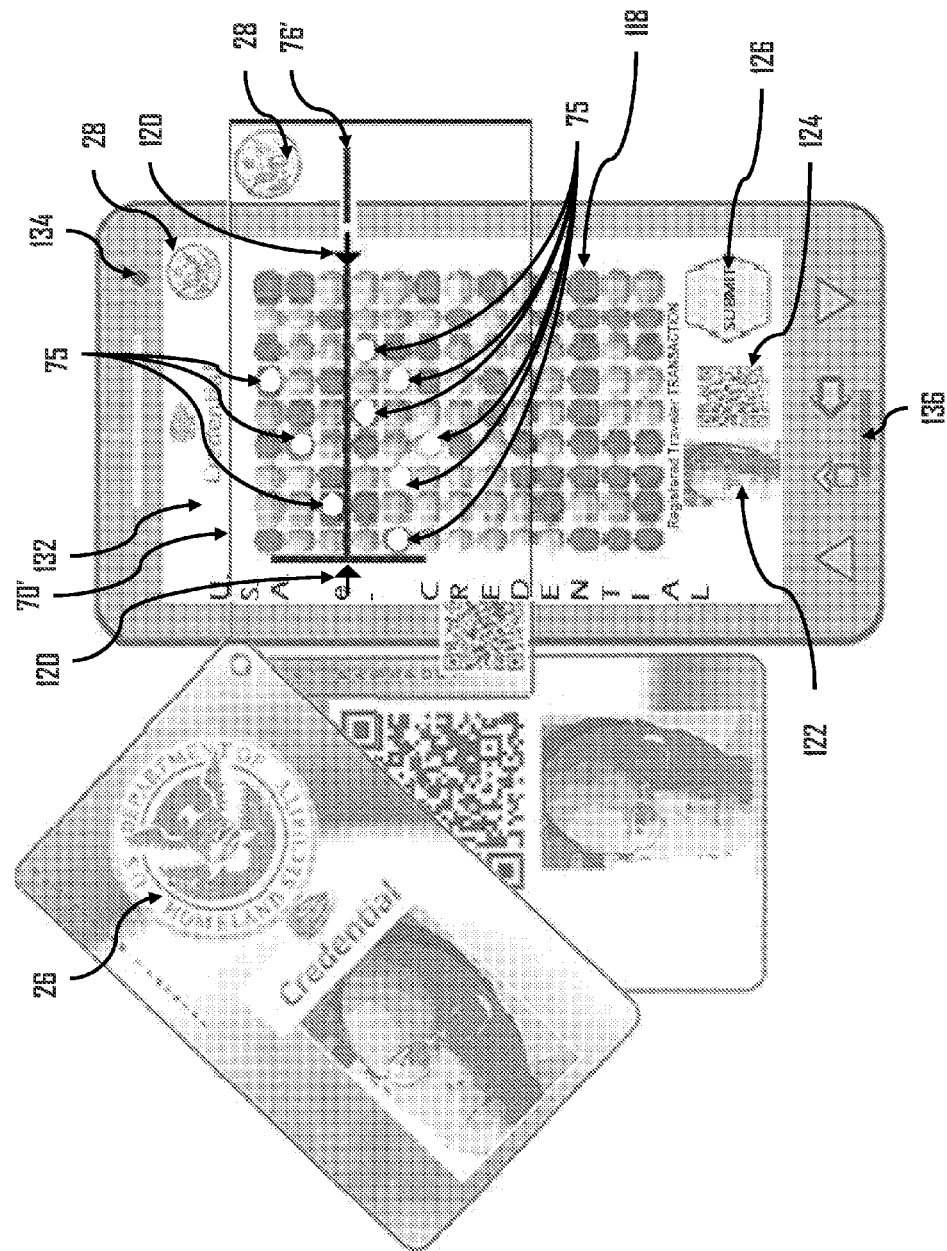
FIG. 12 shows the combination of FIG. 11 with a particular pattern presented on the telephone display to that of FIG. 9 which will enable secure card not present transactions.

FIGS. 11 and 12 illustrate a similar transaction utilizing a "smart" cellular phone 130 that has a touch screen 132, a camera 134 and a fingerprint scanner 136. A document similar to that shown in FIG. 5 includes a transparent card 70 which can overlay the smart phone screen 132 for a transaction. As shown in FIG. 12, the matrix pattern 118 is presented and may, until paused, move about the screen 132.

As in the previous example, the phone screen 132 displays the matrix pattern 118, the caricature 122 and the digital matrix 124. When properly aligned over the matrix 118, the apertures 75 will selectively reveal to the user the appropriate images that correspond to the security or confirmation code. When these are selected, using a stylus or finger pressure, the transaction can proceed. The camera 134 will capture the image of the user when, as required, the caricature image 122 is dragged over the digital matrix image 124 to initiate the transaction. Shown is a submit button 126 for use as may be necessary within the transaction. It may also be necessary to utilize function keys of the phone 130. The dragging of caricature image 122 over the digital trigger matrix image 124 provides the basis for consistent positioning of the user for imaging. If fraud is involved, the image can subsequently be used in the prosecution as all transactions are biometrically bound to the user/customer with transaction specific encryption, decryption keys.

On completion of the transaction, a receipt image or virtual single or multiple use card may be stored in the phone 130 to be displayed to an appropriate detector which will be able to recognize the image as a proper authorization for an action or procedure. For example, the receipt may be a boarding pass for an airline or an authorization for a withdrawal of cash from an ATM machine.

Figure 13:
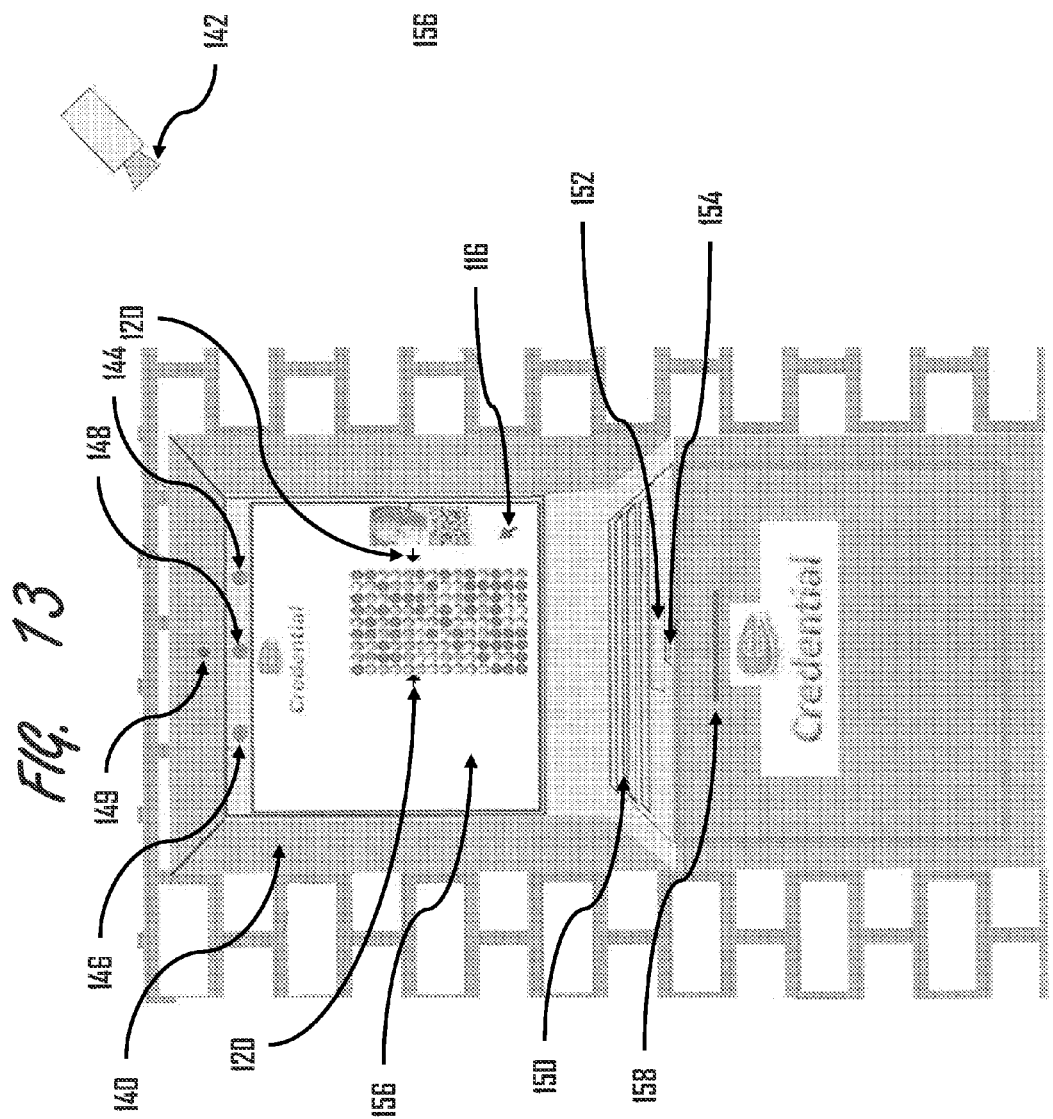
FIG. 13 is view of an ATM machine presenting a display to be used with a document according to the present invention.
Figure 14:
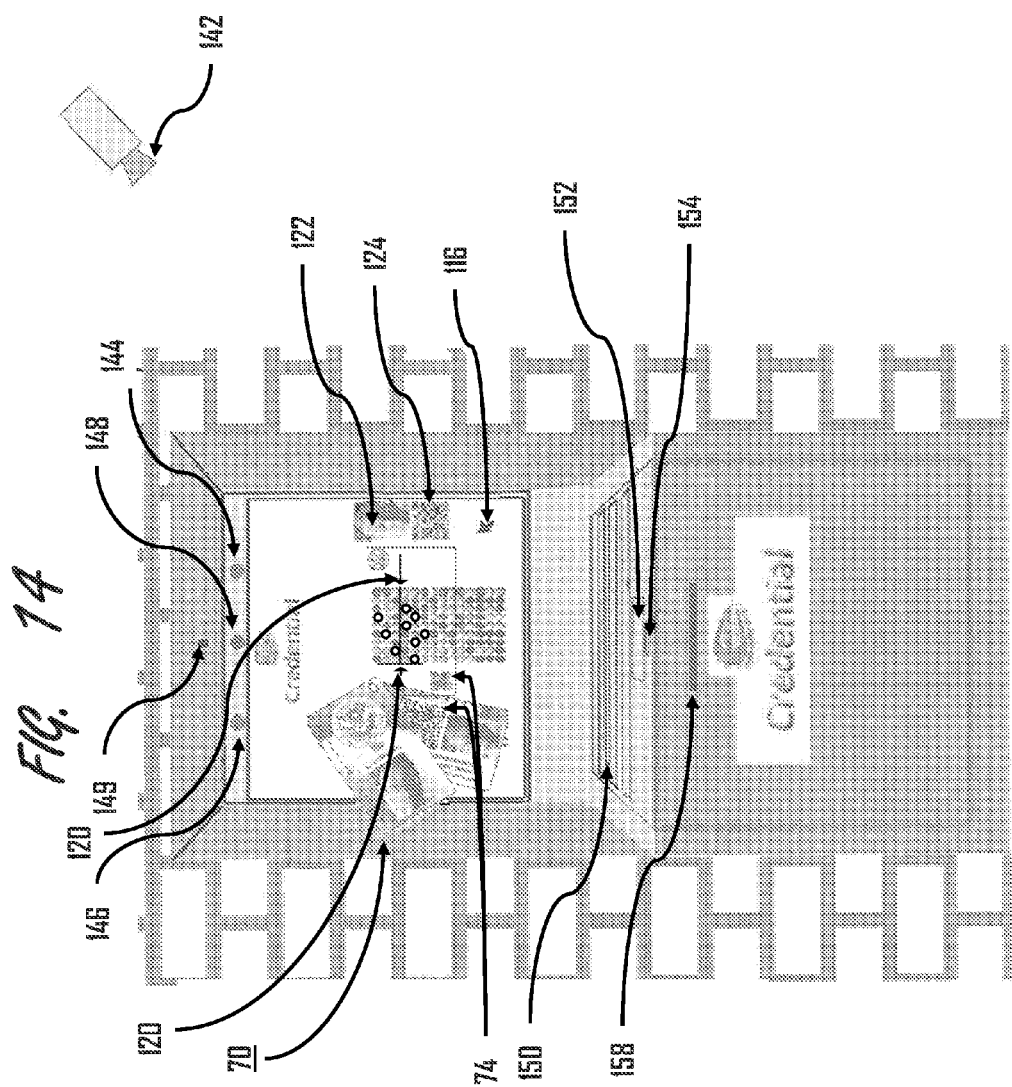
FIG. 14 illustrates the use of the document of FIG. 5 with the ATM machine of FIG. 13

FIGS. 13 and 14 illustrate a secure transaction at an ATM machine 140. A integrated security camera preferably with thermal infrared capability 142 is provided for surveillance to assure that the user is not under a threat or duress or using disguise techniques such as holding a face reconstruction, mask, mannequin or other ruse to defeat the biometric identification data gathering equipment as deployed. The ATM machine 140 is also equipped with a camera 144 and, if stereoscopic or three dimensional images are desired, a second, stereo camera 146 will enable the detection of three dimensional images which might be used to simulate the appearance of the bearer of the document. A thermographic infrared detector 148 can also be utilized to provide biometric information and to detect the presence of facial prostheses which may be used to create a disguise or other subterfuge. A microphone and speaker combination 149 allows voice communication or video conferencing capability with a system operator or manager.

As with a computer, the ATM 140 can also be equipped with a keyboard 150, a touchpad 152 and a fingerprint scanner 154. The display 156, which may be a touch screen, displays, after the user has been identified to the ATM machine 140, possibly through the use of an appropriate digital matrix pattern 74 on the document 70 which is scanned by camera 144. The moving digital matrix 118 is displayed together with the caricature 122 of the user and the digital matrix 124.

With the digital matrix 118 image paused, the transparent card 70' can be aligned with indexing arrows and the confirmation code can be ascertained. As in the earlier examples, the individual code characters are selected and the caricature 122 is dragged and dropped on the digital matrix 124. The user's image is taken by the cameras 144, 146 in combination with cameras 142 and 148 as a part of the transaction record and a desired amount of cash can be dispensed through the dispenser 158.

Figure 15:
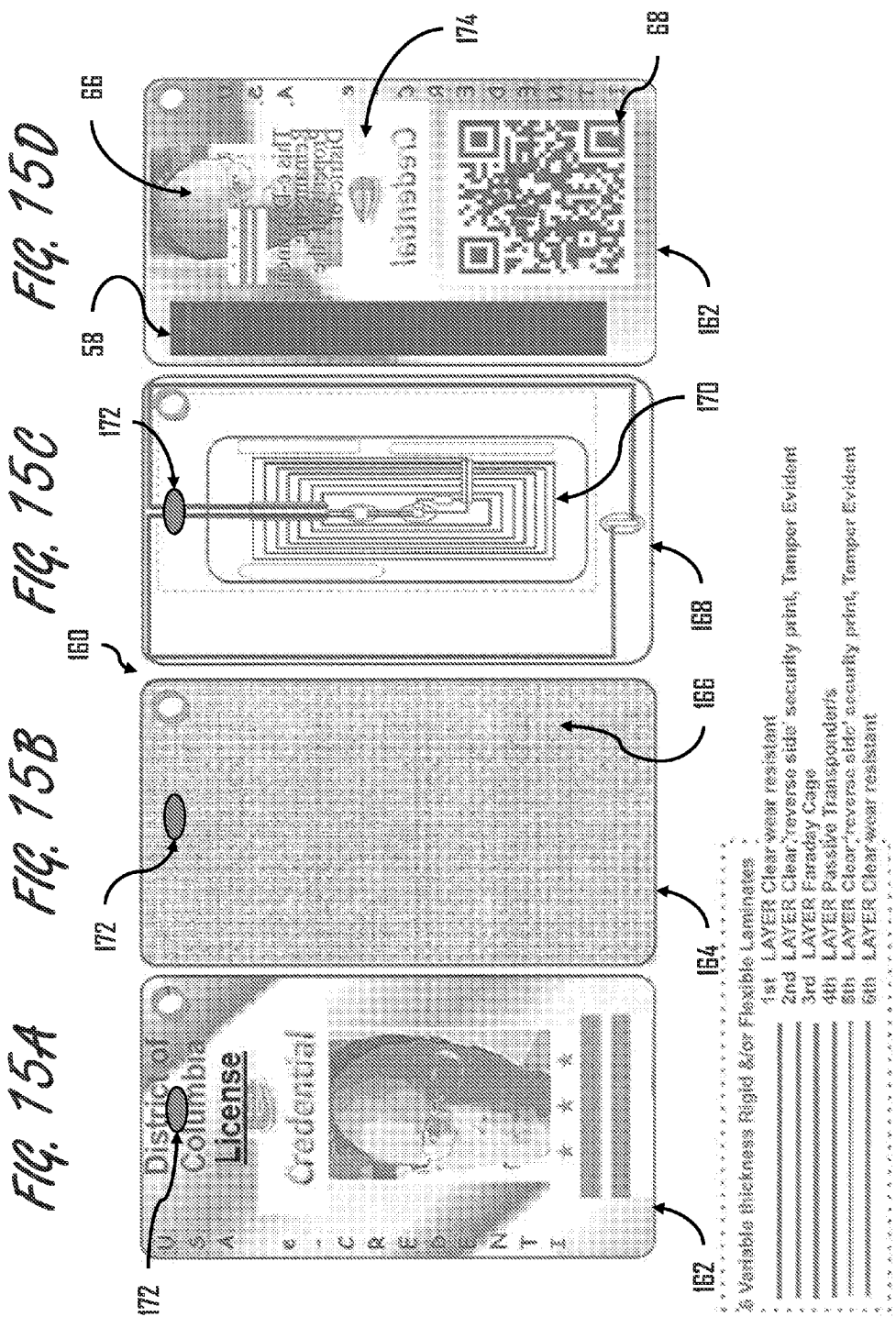
FIG. 15 is a view of the layers comprising one of a pair of laminated documents according to the present invention.
Figure 16:
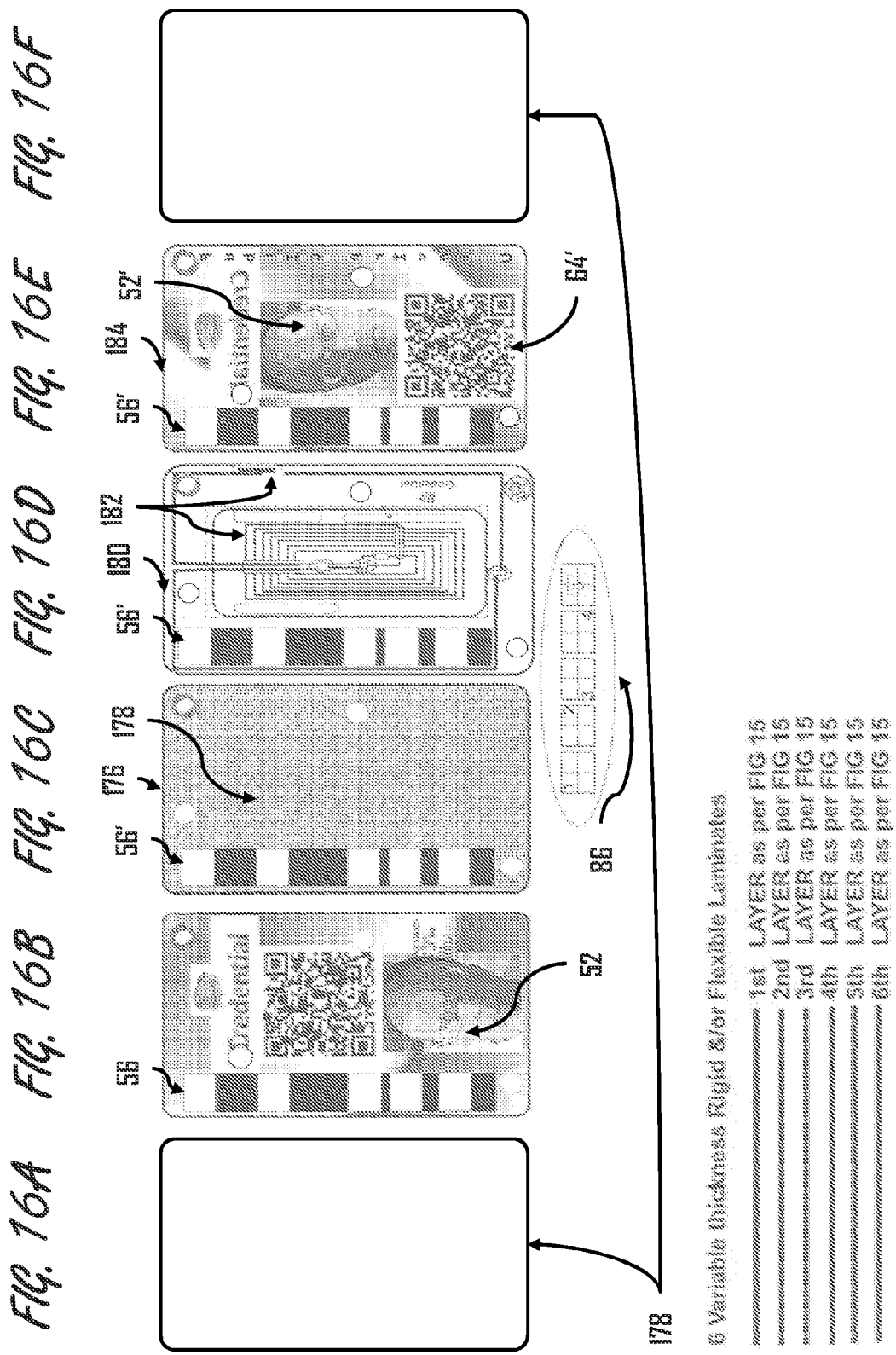
FIG. 16 is a view of the layers comprising the other of a pair of laminated documents according to the present invention.

FIGS. 15 and 16 show the construction of a typical document FIG. 15 including FIGS. 15A, 15B, 15C and 15D show the important layers in a laminated card 160 that includes an RFID circuit. In the preferred embodiment, there are six layers with the outermost layers being clear, wear resistant plastic.

The second layer 162, shown in FIG. 15A would be the obverse layer, here illustrated as a possible District of Columbia Driver's License. A next layer 164 would function as a Faraday cage and can either be a wire mesh or a layer imprinted into a mesh pattern with metallic conductive ink 166.

A fourth layer 168 is the RFID circuit 170 which can be printed using a conductive ink. If desired, a two part antenna circuit can be integrated and would be inactive under normal circumstances but can be activated by a user applying and maintaining pressure on a tactile detectable dome switch 172 through layers 1,2 &3 which is deactivated by manual release of pressure on the dome. Such a switch would make the RFID circuit normally inoperative and would require manual manipulation to complete the circuit and allow the RFID circuit to respond to interrogation at the total discretion of the user.

As seen in FIG. 15D, the layer which is to be the reverse surface 174 can be imprinted preferably using a metal ink [0012] in reverse on a clear substrate. The reverse surface 174 can include features (in reverse) such as the magnetic strip 58, the photo 66 and the code matrix 68. Preferably all laminates are constructed of fluid resistant flexible material and that, if bent or semi-deformed, will return substantially if not completely to its original finished shape or contour.

FIG. 16, including FIGS. 16A, 16B, 16C and 16D shows the construction of a card 178 containing a mask area 56 for acquiring authorization codes. The outer surface layers would be clear, wear resistant plastic. A second layer would be considered the reverse layer for this document and contains, for example, such features as a caricature 52 and a code matrix 64.

A next layer 176 is either a conductive mesh or a printed mesh 178 using conductive inks to act as a Faraday cage for this document. As can be seen, each of the layers includes the mask 56 with clear areas through which authorization or confirmation code characters could be seen. In preferred embodiments, each clear area could accommodate one or more characters which could be placed anywhere within the area. In one embodiment, four or even five characters positions 86 could be found or located in a single area, each in a different part of the area.

The next layer 180, (shown in FIG. 16C) contains an RFID circuit 182, similar to RFID circuit 170 of FIG. 18B wherein a side slider switch is provided to enable the RFID to be holder determined as always "on" or always "off". The next layer 184 has the reverse printed obverse layer of the document including reverse prints of the caricature 52' and the code matrix 54'. Preferably all laminates are constructed of fluid resistant flexible material and that, if bent or semi-deformed, will return substantially if not completely to its original finished shape or contour.

Using the above domed pressure switch controlled RFID and the slider type switch in combination within the same card as FIG. 2, 3, 4, 5, 6, or 7 provides a remarkable combination of user determinable functionalities within the single document or card.

Figure 17:
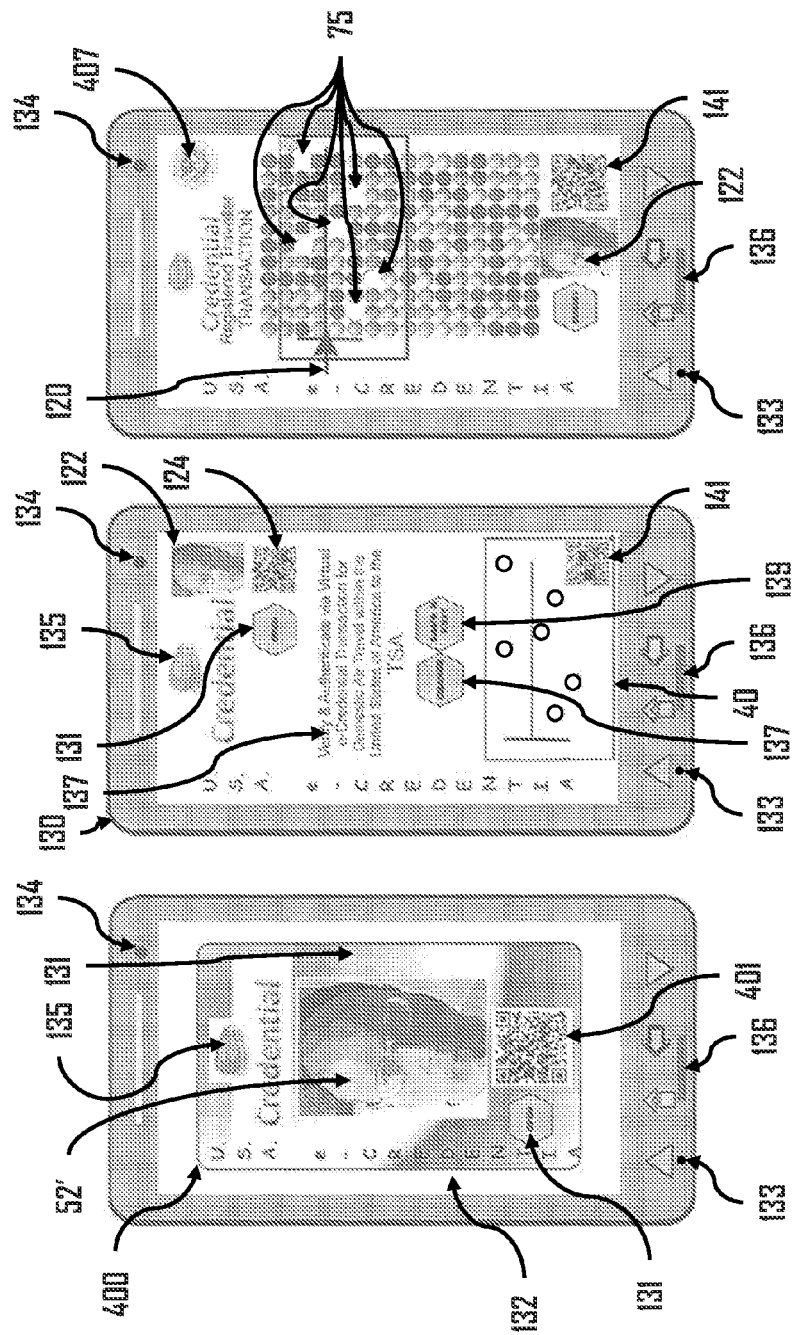
FIG. 17, including

FIG. 17, including FIGS. 17A, 17B and 17C illustrates an alternative use of the smart cellular phone 130 shown in FIGS. 11 and 12. Here a "virtual card" 400 which may be issued by an entity as a companion document to a physical card in any of the previously described forms would replace the need to carry the physical document disclosed above but retains the security and operational features of the above-described real document.

Useful biometric identification data acquisition, particularly in an unsupervised environment, presents particular difficulties. Accordingly this invention utilizes a technique that insures the rightful owner of the card is, by task repetition, self pre-positioned for a camera, in similar manner to so called key stroke recognition, at the times when user verification is required to activate the virtual card.

In FIG. 17A the card 400 has a caricature 52 of the individual and a transaction specific security coded matrix trigger 401 which when displayed to a merchant would activate their terminal for subsequent use as per FIGS. 9, 10 with a virtual card issued by the card entity to the vendor for the virtual card holder's subsequent use. The vendor's terminal may require the completed transaction to conclude with the card holder dragging the displayed caricature over the transaction specific security coded matrix trigger. This activates the terminal's camera or cameras to collect an image or sequence of images or derived templates thereof and transmit all that data to the entity. On completion of a successful transaction, the entity would forward to the card holder's virtual card holding device 130 their receipt which may be in the form of a single use or multiple use matrix, which would be linked to the virtual card holder's biometrics. This could be required should the receipt be used as a boarding pass by, for example, the Department of Homeland Security or other agencies of the government.

In another method of use, the complete transaction can be initiated and completed via the virtual card holding device 130. After the virtual card holder opens the virtual card 131 via an application on device 130 a card transaction with the virtual card issuing entity 135 is illustrated by one such potential entity, namely an entity that conducts a ubiquitous universal biometric authorized and validated service to its customers but this could apply to a single card provider who each issues its own individual virtual cards in like manner.

A transaction is activated by initiating the displayed card's Open button 131. Thereafter, one such transaction could be with an air carrier that is required to interface with the US TSA for US domestic air passenger identification and travel authority. Accordingly the transaction may be conducted via several screens leading to FIG. 17B which initially displays 131, 135, change 137, save & enter, open 131 buttons and text 137. This screen is further used by activating the verification and validation transaction specific security coded matrix trigger 124 which is activated by dragging caricature 122 and dropping it over matrix 124. During this process, the device's camera or cameras 134 then collect an image or sequence of images or derived templates thereof and transmit all that data to, in this case, the entity interfacing with the TSA or directly.

On a satisfactory result, further display 400 is added with which is incorporated an active matrix relative to the template locators 57. The transaction continues in one of three ways, one button "save & exit" 139 is activated which terminates the transaction at that point to be resumed at a later time. Two, "change" button 137 is activated which results in another template 400 being issued, or, Three, the template 409 active matrix 141 is activated by touch, stylus, or cursor click.

Subsequently an active screen 120, as seen in FIG. 17C, is displayed as previously generally discussed FIGS. in 9 and 10 wherein locator 120 randomly moves about and is stopped on the user's selection by activating the transaction matrix 141 which stops locator 120 movement. The template is then dragged into alignment with locator 120 as illustrated and the displayed colored spheres are activated via the template 75 locators. The system then recognizes the allocated alpha numeric code relative to matrix 141 against the position selected by locator 120. When the card holder completes this "card not present" action caricature 122 is dragged over active matrix trigger 141 which again activates biometric camera sensor 134 as previously discussed. A successful transaction is indicated, preferably, by the addition of their departmental seal 407 or further biometric identification may be signaled to be submitted via finger print sensor 136. Actuating the "submit" button 405 terminates the transaction.

Thereafter, as previously discussed, a virtual receipt or pass may be issued that bears the respective caricature. A single or multiple use active matrix, is required as to the requesting individual's use of respective entities system or network of systems. Preferably, a caricature 122 of the expected card holder is displayed together with a transaction encrypted security matrix issued for the next appropriate use.

For additional security purposes, a fingerprint may be required to be scanned by the scanner 136 and a photo image can also be taken by the camera 134 before any transaction commences. Should it be necessary, the "open" button remains inactive until this action is completed at which time it is illuminated to signal that the required biometric data has been collected. Thereafter, the transaction proceeds after the "open" button is touched on screen 132. This touch results in the transmission of the the fingerprint and photo for biometric recognition and, when recognized, a transaction screen is presented, as shown in FIG. 17B. Thereafter, all actions are the same as the above.

Again, on completion as above, a confirmation receipt of a successfully completed transaction can then be sent to the phone for later use. If the transaction sought is a travel authorization, the stored receipt could later be used at embarkation and or debarkation points to permit access to the facility, transport vehicle or other appropriate uses.

Figure 18:
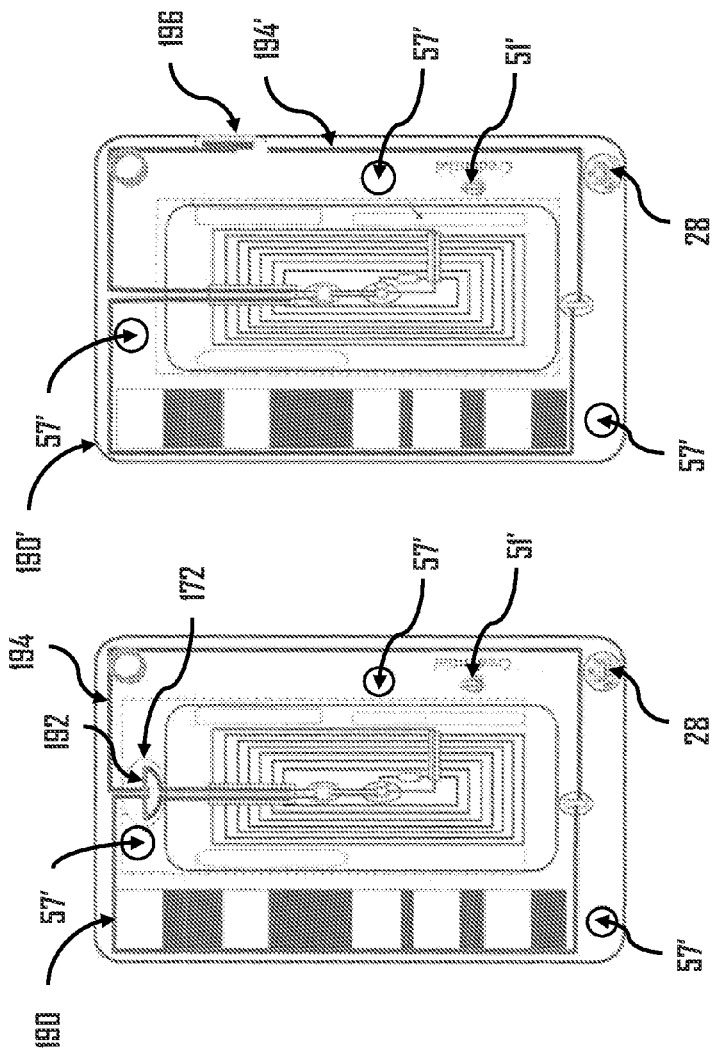
FIG. 18 including
Figure 19:
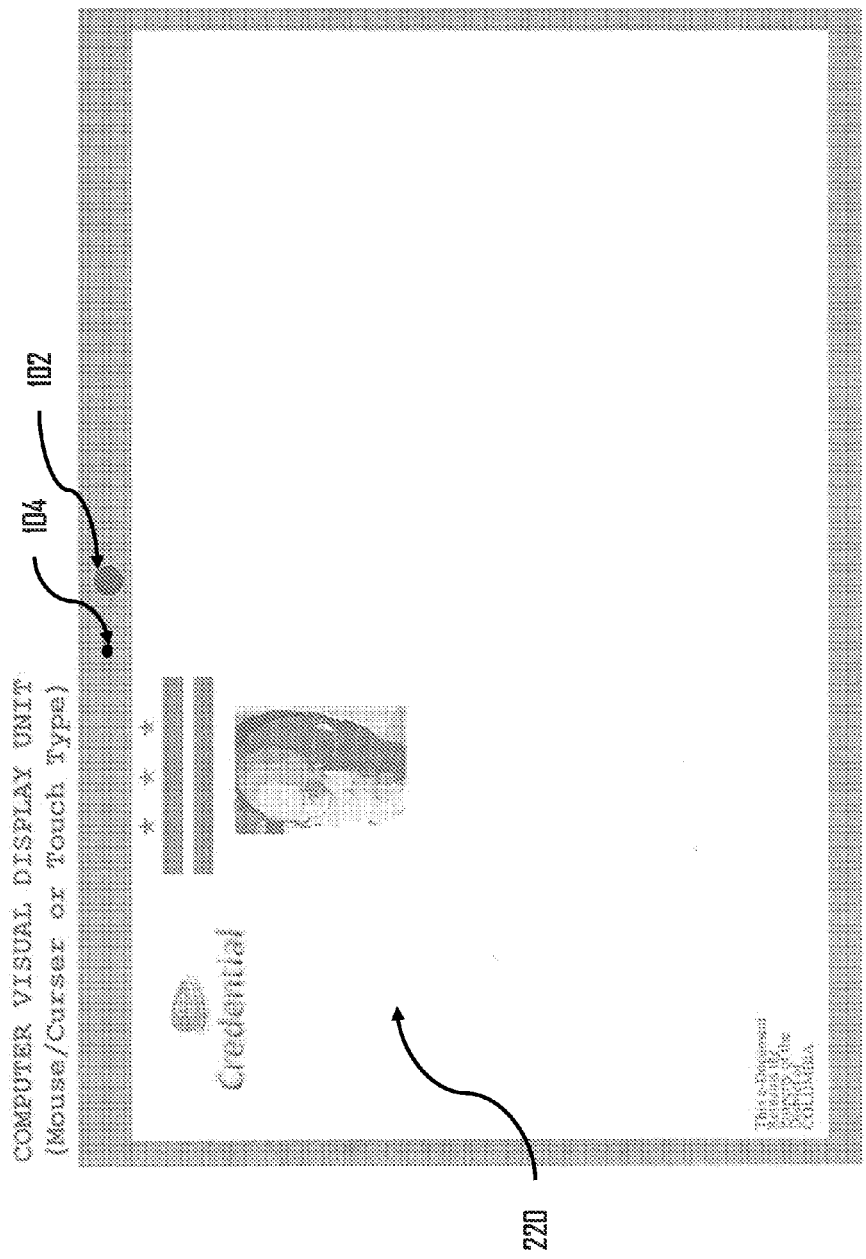
FIG. 19 is a view of a wireless internet computer integrated display at the beginning of a secure transaction.

FIG. 18, including FIGS. 18A and 18B, shows alternative RFID devices which can be separate documents on a card that can be inserted into or on a laminate of the card of, for example, FIG. 2, 3, 4, 5,6 or 7. The RFID device 190 of FIG. 18A is provided with a dome 172 to activate pressure switch 192 which is normally open and, accordingly, interrupts the antenna portion 194 of the RFID circuit. Manual pressure on the switch 192 completes the circuit, allowing the RFID circuit to respond to interrogations.

Similarly, the alternative RFID device 190' of FIG. 18B is provided with a slide switch 196 which interrupts the antenna portion 194' of the RFID circuit, thus disabling it. When the slide switch 196 is closed, the circuit is completed and the RFID circuit can respond to interrogations. Using the slide switch 196 permits the RFID circuit to be in an active or inactive state without the need for maintaining pressure on a switch.

An official Government Seal 28' or corporate icon 51' can be security printed with metal ink for authentication purposes and may have an imbedded coded number.

Figure 20:
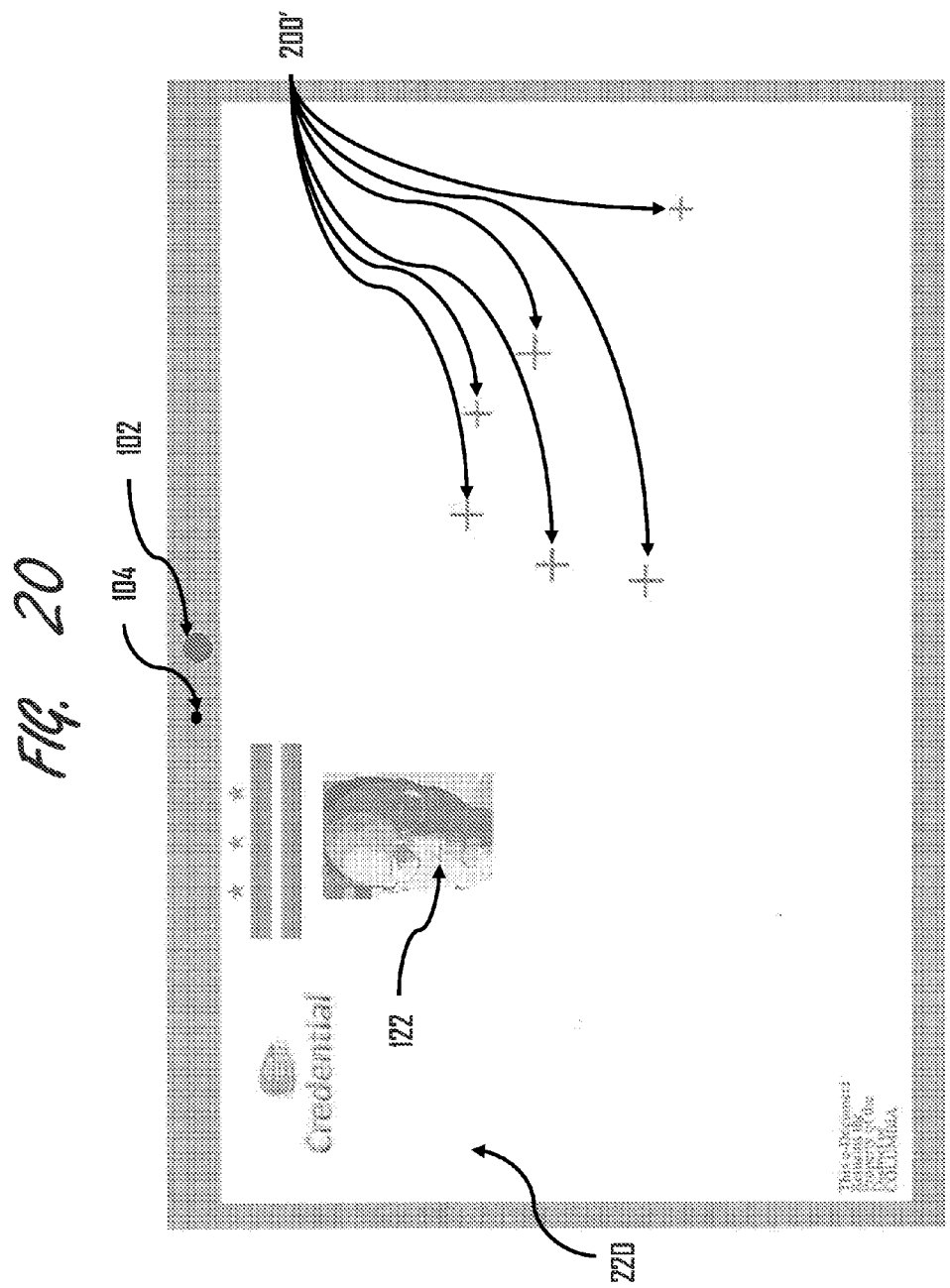
FIG. 20 is a view of the integrated computers display of FIG. 19 at a second stage of a secure transaction.

FIGS. 19-22 illustrate the steps in a secure transaction utilizing a different form of an authenticating or confirming code while utilizing a document as in FIG. 4 and a touch screen display as shown, for example, in FIG. 8. In FIG. 20, a group of indexing elements 200 are displayed to enable alignment with the indexing apertures 57' so that the mask 56' can be used to find the characters comprising a confirmation code.

Figure 21:
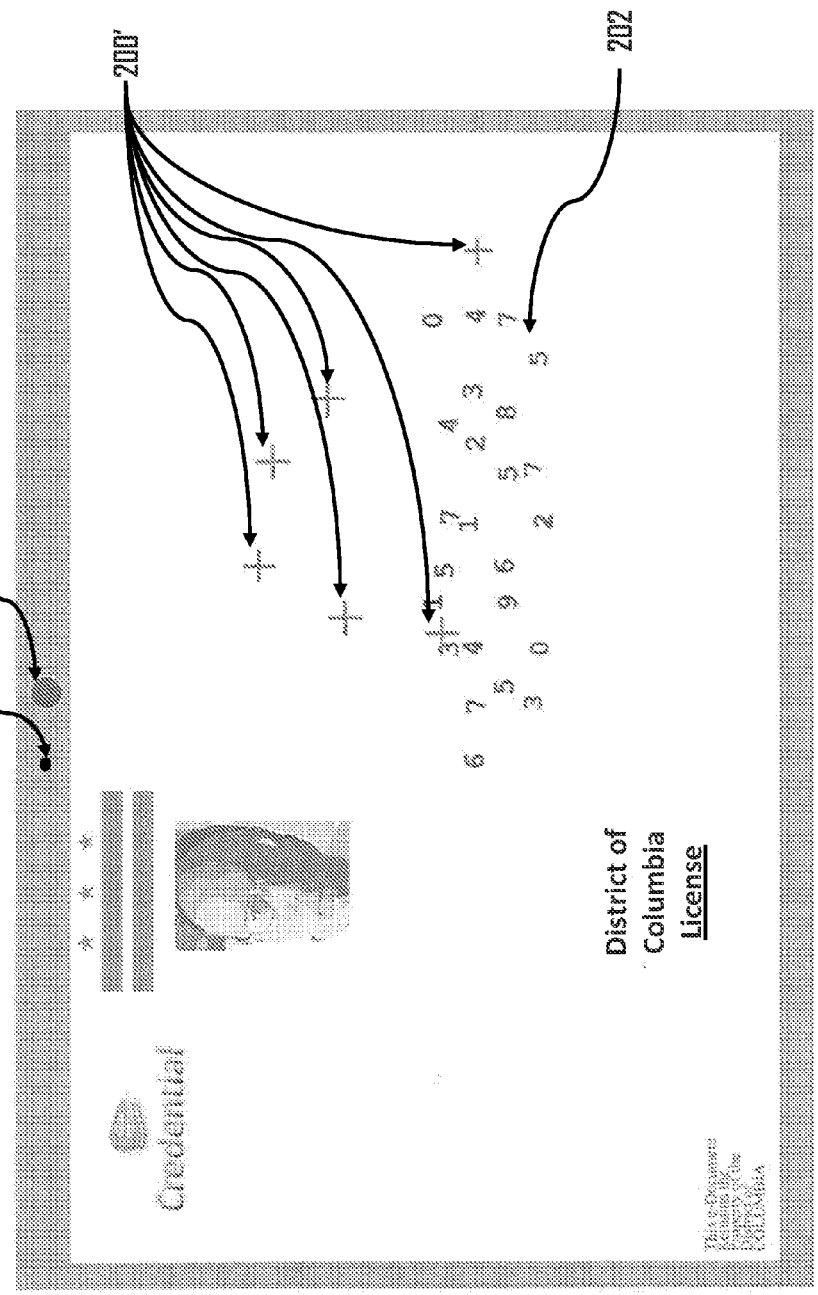
FIG. 21 is a view of the display of FIG. 19 at a third stage of a secure transaction.
Figure 22:
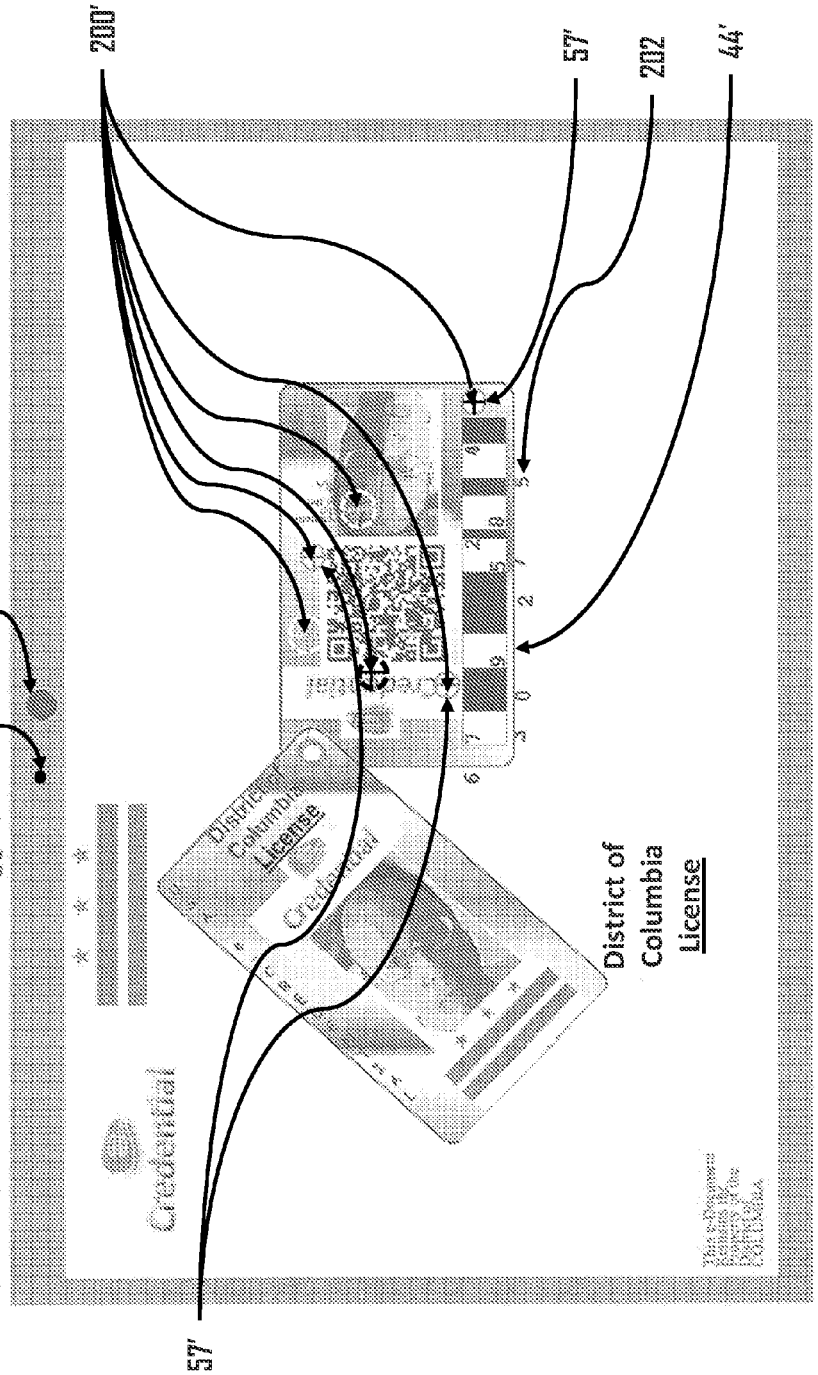
FIG. 22 is a view of the display of FIG. 19 at a fourth stage of a secure transaction aided by the document of FIG. 3 or FIGS. 2, 4, 6 or 7.

In FIG. 21, the display shows a matrix of numbers which also could be alpha numeric characters 202 which includes the confirmation code characters. In FIG. 22, the card II 44' is placed against the screen with the indexing apertures 57' aligned with indexing elements 200 so that the mask 56' displays only the characters of the number matrix 202 making up the confirmation code, in this example, the numbers 795284. As noted earlier, the characters can appear in any area of the mask 56' windows and, more than one character can appear in a window.

Figure 23A:
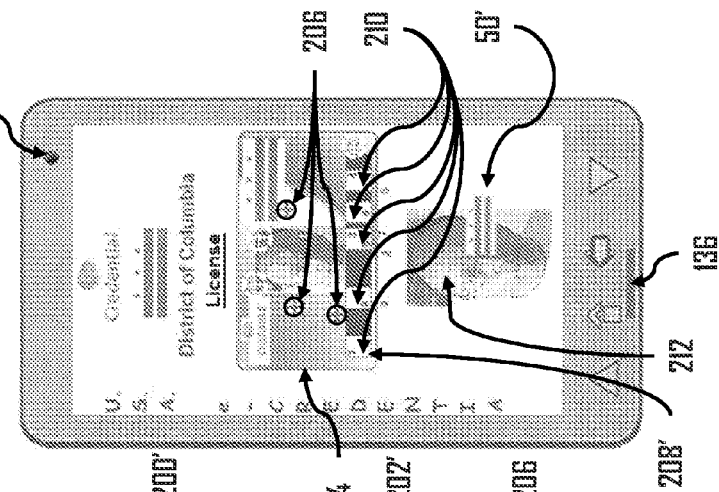
FIGS. 23A, 23B and 23C, shows the stages of a secure transaction using a "smart" cellular phone and a virtual card.
Figure 23B:
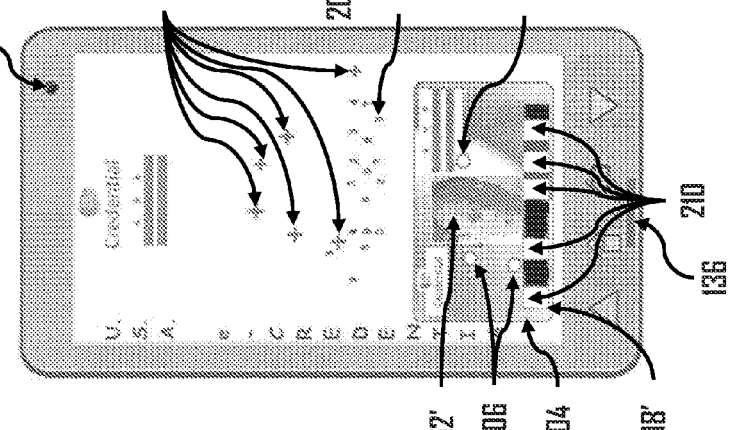
Figure 23C:
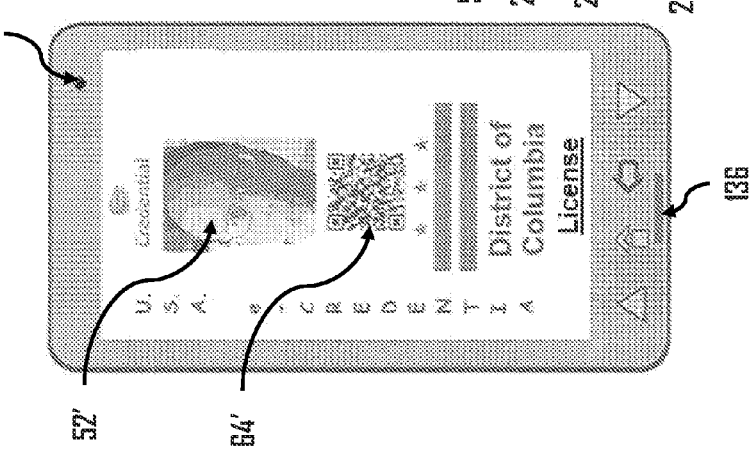

FIG. 23, including FIGS. 23A, 23B and 23C illustrate a similar transaction using a smart cellular phone such as previously described which includes a camera and a fingerprint reader. In FIG. 23A, a transaction is started by contacting a web site which transmits the caricature image 52' of the user and an image of a digital matrix 64'. If the caricature 52' is dragged and dropped over the matrix 64', the camera 134 takes an image of the user and transmits it back to the website. If the user is verified, a new image is transmitted as shown in FIG. 23B.

The new image includes a virtual card 204 which includes a caricature 52', indexing apertures 206 and a virtual mask 208 with individual windows 210. Also present are indexing elements 200' and a confirmation matrix 202'. The virtual card 204 can be positioned so that the indexing apertures 206 align with the indexing elements 200'. This places the characters constituting the confirmation code into the windows 210 of the virtual mask 208 as seen in FIG. 23C.

By moving the virtual card 204, a partially obscured photo image 212 of the user is revealed. As before, the confirmation code, here 795284 is selected with a stylus and a transmit key on the phone is accessed, transmitting the information back to the web site. As before, a photo may be taken to maintain a record of the user of the phone at the time the transaction was consummated.

Considering the safety and security of transactions using the concepts of the present invention, whether with real or virtual documents, yet additional applications have been made possible. A user controlled "virtual wallet" or "purse" in which several different entities' virtual cards can be securely kept collectively and used only when the rightful owner chooses. This aspect takes on particular importance should the device holding the cards be lost or stolen. "Virtual" credit or other entity cards, in addition other user credentials, may be created as secure files and subfiles in a remote server accessible securely through the internet by their own creation of a personal virtual card with its own unique encryption/decryption trusted key exchange for the user's personal use, Such virtual accessible documents could be a birth certificate, marriage certificate, deeds to property, and any other valuable document whose presentation may be required.

Such a key exchange may involve the use of multiple encrypted and re-encrypted session key exchanges and which may be triple or more times key transfer sequences to ensure system integrity throughout all transactions. At least one of the keys used may be biometrically based, being derived from the user's biometrics.

These security steps are taken in order to facilitate an evidentiary chain of accountability for later use should that be necessary in a legal proceeding. Contacting the server and establishing identity through the use of a smart phone with fingerprint scan capabilities and a camera can retrieve an identity verification document.

As shown in FIG. 24, which includes FIGS. 24A, 24B, 24C and 24D, the various steps in such a transaction are illustrated. A "smart" cellular telephone 130 with touch screen 132, such as is shown in FIG. 11, is employed in the present example. A camera 134 and a fingerprint reader 136 provide biometric verification as the identity of the user is confirmed. An opening display for the process can include a caricature 30' and a digital matrix 32'. In one embodiment, the process is begun by dragging the caricature 30' over the digital matrix 32' which transmits a signal to provide the next screen as shown in FIG. 24B, as well as taking a picture & or an iris image of the phone user via camera 134. Alternatively, a finger scan 135 or a voiceprint from microphone 133 may be used alone or in any combination.

In FIG. 24B, a confirmation matrix 202' is displayed and supplies the necessary confirmation characters to the virtual card 204' which has indexing apertures 206' and a mask 208' with which to view the confirmation code which is a onetime PIN. The code characters are revealed when the indexing apertures 206' are superimposed over the indexing elements 200'. The clear windows in the mask 208' display the confirmation code characters, here the number 795284. As in the other examples, the confirmation code characters are selected with manual touch or with a stylus and the information is transmitted with, if desired, the photo of the user.

The server or onboard processor acknowledges receipt of correct confirmation code input supported by biometric evidence by displaying, if correctly entered, the virtual "wallet". If confirmed, the "wallet's" clasp will open as shown 207. The virtual wallet can now be dragged open or for privacy may be dragged closed or opened again without locking it at any time. FIG. 24D, shows an open virtual wallet 214 together with a caricature 30' and a digital matrix 32'. The user can then select a virtual credit card or other virtual document contained within the wallet to enable a subsequent secure transaction.

At the conclusion of the owner's use, the virtual wallet is dragged closed and the clasp double tapped or clicked to lock it, at which time another photograph may be taken to memorialize the action. The visual impact of the easily visible clasp position, indicating the security or accessability of the virtual cards contained therein, is a safety feature that cannot be underestimated, particularly for individuals that may be, in part, visually impaired. Of course all functions that are satisfactorily accomplished may be accompanied by function distinctive vibrations and sounds.

All transactions for the user's audit benefit can be date time stamped and encrypted within all records that the user chooses to maintain. However, the virtual cards provided by entities other than the virtual wallet owner are not accessible unless the entity provides that authority within the foregoing described process.

Turning finally to FIGS. 25 and 26, they illustrate a secure transaction using a computer display 220 and a virtual card. The computer display 220 is preferably a touch screen. In FIG. 25, there s shown on the display 220 an image 222 of a document substantially similar to the virtual card 204 of FIG. 24 which is to be used in substantially the same way. Also shown on the display 220 is a caricature 30' and a digital matrix 32'. For this phase of the transaction, indexing elements 200' are also displayed.

In FIG. 26, a confirmation matrix 202' is displayed and, when covered by the mask portion of the virtual card image 222, reveals a confirmation code when indexing apertures 206' are aligned with indexing elements 200'. In this example, the confirmation code is 79584.

As with the other examples, the code can be entered by touching the display 220 at those numbers. The transaction can be completed with the provision of a virtual "submit" button on the display 220 or by any other predetermined combination of image movement or manual activation of the display 220.

Thus there has been disclosed a novel document having a plurality of sides, most of which are normally concealed. The document includes features that are images that are sufficiently degraded so as to defeat facial recognition equipment yet not so degraded as to prevent a human observer to confirm that the image is that of a legitimate bearer of the document. Real images of the bearer on the concealed side are strategically covered with a non transparent official seal that obstructs enough of the image to substantially defeat face recognition techniques but sufficiently exposed to facilitate human confirmation of the holder.

Other features include masks that can be used with displays to select authorization or confirmation code characters from a matrix of characters. The documents can also include magnetic strips and other types of machine readable lines of text which can store information about the person with whom the document is associated and information strips containing data susceptible to optical scanning.

The document can have embedded an RFID processor circuit or a plurality of RFID processor circuits, any one or all of which can be interrogated and, alternatively, the RFID processor circuit can be made operable or inoperable by the bearer.

Moreover, the document need not be a physical document but can exist as a virtual document which possesses the features of the real document and which can be used in a similar fashion in conjunction with computer or other machine displays or with smart cellular telephones or the like. The telephones and displays can have, associated with them, cameras, fingerprint scanners, thermographic infrared sensors and other devices capable of acquiring biometric information about the authorized bearer as well as reading high density data images from other documents in both real and virtual displays.

All of the foregoing embodiments may utilize computer, smart phone or the like with specific applications that, during the loading sequence, will incorporate the identification data of the device, including its display size and features such as touch sensitive, as well as that of the authorized user or users should there be more than one. This facilitates specific verification and/or authentication sequences that will facilitate speedy transactions between different computer—smart phone or the like combinations.

Further, each specific application embodying this feature will be enabled in such a way as to facilitate its remote decommissioning should it be lost or stolen. Additionally under such circumstances, the specific application that has been decommissioned may be capable of operation in a "stolen" mode to self report its location via inbuilt GPS functionality as well as gathering biometric data from any attempted uses for evidentiary use in any subsequent legal action.

Yet another disclosure is an ATM machine that does not need a card transport and security reading mechanism or a keyboard despite its illustrated presence in FIGS. 13 and 14. Such an ATM can operate in conjunction with a touch screen or the like in conjunction with virtual card transactions being instigated or completed via mobile smart phone in all aspects except the confirmed cash dispensing function which can be enabled by an appropriate image on a handheld device. This will save substantial time in front of an ATM, freeing it up for other users in high volume areas. All of the foregoing ATM features and the physical machine as well as users being under direct integrated counter surveillance cameras can proactively detect unlawful acts and record encrypted evidence of the same under any lighting condition.

Other embodiments and techniques within the scope of the invention will manifest themselves to those skilled in the art. Therefore, the scope of the invention should only be limited by the claims appended hereto.

What is claimed is:

1. A method of identification for granting access using a multi faced document comprising at least two external and visible faces and at least two internal and not generally visible faces wherein each face visually reveals different combinations of data in sensible notation perceivable by persons and by apparatus:
   a. creating on an external face, a digital file displayable as a visual image representative of an individual which is recognisable by human observers as a representation of that individual;
   b. creating on an external face a digital file displayable as a visual image representative of an entity which is recognisable by human observers as a representation of that entity;
   c. creating on an internal face, a digital file containing a database location wherein the individual document's information is maintained and which digital file is readable by machine;
   d. creating on an internal face, a machine readable digital file displayable as a visual image containing at least one individual entity database location;
   e. accessing an internal face digital file for displaying to a human controller a visual image for the purpose of comparing said digital file visual image with the individual carrying the document; and
   f. granting access to that individual if said controller recognises the individual as the individual whose image is displayed.

2. The method in claim 1 wherein the steps of creating said digital are done in a tamper evident manner.

3. The method of claim 1 wherein the steps of creating said digital files include the storing of an indicia of source.

4. The method of claim 1 further including the step of adding additional indicia to the document.

5. The method of claim 1 wherein at least one of said digital files further includes visually identifiable attributes.

6. The method of claim 1 wherein at least one of said digital files is stored as a matrix.

7. The method of claim 1 further including the step of storing machine readable information on the document for the purposes of subsequent data acquisition.

8. The method of claim 1 further including the step of storing at least one of said digital files and other identifiable attributes in a database.

9. The method of claim 1 further including the step of creating a data-store as part of the document.

10. The method of claim 1 wherein the image stored in at least one of said external face digital files and displayed by the document is a caricature of said individual.

11. The method of claim 10 wherein said caricature is a degraded image of said individual.

12. The method of claim 11 wherein said caricature is not machine recognisable as a representation of that individual.

13. The method of claim 10 wherein said caricature is a drawing.

14. The method of claim 13 wherein said caricature is not machine recognisable as a representation of that individual.

15. A method of claim 1 wherein at least one visual image is a photographic representation of said individual.

16. A method of claim 1 wherein said inner faces are reserved for information preferably kept private.

17. A method of claim 1 wherein said outer faces are reserved for information not deemed sensitive if viewed by others.

\* \* \* \* \*